(12) United States Patent
Tanaka et al.

(10) Patent No.: US 7,424,639 B2
(45) Date of Patent: *Sep. 9, 2008

(54) DISK ARRAY SYSTEM AND FAILURE RECOVERING CONTROL METHOD

(75) Inventors: Katsuya Tanaka, Tokyo (JP); Tetsuya Uemura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 11/548,140

(22) Filed: Oct. 10, 2006

(65) Prior Publication Data

US 2007/0174676 A1 Jul. 26, 2007

Related U.S. Application Data

(63) Continuation of application No. 10/656,492, filed on Sep. 5, 2003, now Pat. No. 7,222,259.

(30) Foreign Application Priority Data

Mar. 7, 2003 (JP) ............................. 2003-061403

(51) Int. Cl.
 *G06F 11/00* (2006.01)
(52) U.S. Cl. ............................................. 714/7; 714/6
(58) Field of Classification Search .................... 714/4, 714/5, 6, 7; 711/114
See application file for complete search history.

(56) References Cited

U.S. PATENT DOCUMENTS

| 5,077,736 | A | 12/1991 | Dunphy, Jr. et al. |
| 5,583,876 | A | 12/1996 | Kakuta |
| 5,600,783 | A | 2/1997 | Kakuta et al. |
| 5,737,510 | A | 4/1998 | Kakuta et al. |
| 5,867,640 | A | 2/1999 | Aguilar et al. |
| 6,058,489 | A | 5/2000 | Schultz et al. |
| 6,148,352 | A | 11/2000 | Coale et al. |
| 6,874,100 | B2 | 3/2005 | Rauscher |
| 6,928,514 | B2 | 8/2005 | Chatterjee et al. |
| 7,236,454 | B2 * | 6/2007 | Sakai ........................ 370/225 |
| 2002/0174296 | A1 | 11/2002 | Ulrich et al. |
| 2004/0064638 | A1 | 4/2004 | Chong |
| 2005/0108475 | A1 | 5/2005 | Yamamoto |
| 2005/0154815 | A1 | 7/2005 | Molander et al. |
| 2005/0204206 | A1 | 9/2005 | Arai et al. |

FOREIGN PATENT DOCUMENTS

| JP | 07-230362 | 8/1995 |
| JP | 09-016343 | 1/1997 |

* cited by examiner

*Primary Examiner*—Joshua A Lohn
(74) *Attorney, Agent, or Firm*—Townsend and Townsend and Crew LLP

(57) ABSTRACT

In a disk array system composed of a disk controller connected to a host system and a maintenance terminal and a disk array connected to the disk controller via a disk channel, when failure occurs in a drive in the disk array, the disk controller writes data stored in a plurality of disk drives on a faulty board on which a faulty drive is mounted into substitution disk drives and informs the maintenance terminal that the faulty board is replaceable after the reorganization of logical groups is completed.

20 Claims, 18 Drawing Sheets

DISK ADAPTER 20

DISK ARRAY 5

PORT BYPASS CIRCUIT (PBC) 7

FIG. 10
BOARD MANAGEMENT TABLE 80

| BOARD NUMBER: BRD (801) | X COORDINATE (802) | Y COORDINATE (803) | BOARD STATUS CODE (804) | DRIVE NUMBER: PDEV (805) | |
|---|---|---|---|---|---|
| 0 | 0 | 0 | 0 | {0, 1, 2, 3} | 800-0 |
| 1 | 1 | 0 | 0 | {4, 5, 6, 7} | 800-1 |
| 2 | 2 | 0 | 0 | {8, 9, 10, 11} | 800-2 |
| 3 | 3 | 0 | 0 | {12, 13, 14, 15} | |
| 4 | 4 | 0 | 0 | {16, 17, 18, 19} | |
| 5 | 5 | 0 | 0 | {20, 21, 22, 23} | |
| 6 | 6 | 0 | 1 | {24, 25, 26, 27} | |
| 7 | 7 | 0 | 1 | {28, 29, 30, 31} | |
| 8 | 0 | 1 | 0 | {32, 33, 34, 35} | |
| 9 | 1 | 1 | 0 | {36, 37, 38, 39} | |
| 10 | 2 | 1 | 0 | {40, 41, 42, 43} | |
| 11 | 3 | 1 | 0 | {44, 45, 46, 47} | |
| 12 | 4 | 1 | 0 | {48, 49, 50, 51} | |
| 13 | 5 | 1 | 0 | {52, 53, 54, 55} | |
| 14 | 6 | 1 | 1 | {56, 57, 58, 59} | |
| 15 | 7 | 1 | 1 | {60, 61, 62, 63} | |
| 16 | 0 | 2 | 0 | {64, 65, 66, 67} | |
| 17 | 1 | 2 | 0 | {68, 69, 70, 71} | |
| 18 | 2 | 2 | 0 | {72, 73, 74, 75} | |
| 19 | 3 | 2 | 0 | {76, 77, 78, 79} | |
| 20 | 4 | 2 | 0 | {80, 81, 82, 83} | |
| 21 | 5 | 2 | 0 | {84, 85, 86, 87} | |
| 22 | 6 | 2 | 1 | {88, 89, 90, 91} | |
| 23 | 7 | 2 | 1 | {92, 93, 94, 95} | |
| 24 | 0 | 3 | 0 | {96, 97, 98, 99} | |
| 25 | 1 | 3 | 0 | {100, 101, 102, 103} | |
| 26 | 2 | 3 | 0 | {104, 105, 106, 107} | |
| 27 | 3 | 3 | 0 | {108, 109, 110, 111} | |
| 28 | 4 | 3 | 0 | {112, 113, 114, 115} | |
| 29 | 5 | 3 | 0 | {116, 117, 118, 119} | |
| 30 | 6 | 3 | 1 | {120, 121, 122, 123} | |
| 31 | 7 | 3 | 1 | {124, 125, 126, 127} | 800-31 |

FIG. 11
DRIVE MANAGEMENT TABLE 81

| DRIVE IDENTIFICATION NUMBER (PDEV) | BOARD NUMBER | Z COORDINATE | MAXIMUM LOGICAL BLOCK ADDRESS | PDEV STATUS CODE |
|---|---|---|---|---|
| 0 | 0 | 0 | 0x1FFFFFFF | 0 |
| 1 | 0 | 1 | 0x1FFFFFFF | 0 |
| 2 | 0 | 2 | 0x1FFFFFFF | 0 |
| 3 | 0 | 3 | 0x1FFFFFFF | 0 |
| 4 | 1 | 0 | 0x1FFFFFFF | 0 |
| 5 | 1 | 1 | 0x1FFFFFFF | 0 |
| 6 | 1 | 2 | 0x1FFFFFFF | 0 |
| 7 | 1 | 3 | 0x1FFFFFFF | 0 |
| 8 | 2 | 0 | 0x1FFFFFFF | 0 |
| 9 | 2 | 1 | 0x1FFFFFFF | 0 |
| 10 | 2 | 2 | 0x1FFFFFFF | 0 |
| 11 | 2 | 3 | 0x1FFFFFFF | 0 |
| 12 | 3 | 0 | 0x1FFFFFFF | 0 |
| 13 | 3 | 1 | 0x1FFFFFFF | 0 |
| 14 | 3 | 2 | 0x1FFFFFFF | 0 |
| 15 | 3 | 3 | 0x1FFFFFFF | 0 |
| 16 | 4 | 0 | 0x1FFFFFFF | 0 |
| ⋮ | ⋮ | ⋮ | ⋮ | ⋮ |
| 32 | 8 | 0 | 0x1FFFFFFF | 0 |
| 33 | 8 | 1 | 0x1FFFFFFF | 0 |
| 34 | 8 | 2 | 0x1FFFFFFF | 0 |
| 35 | 8 | 3 | 0x1FFFFFFF | 0 |
| 36 | 9 | 0 | 0x1FFFFFFF | 0 |
| ⋮ | ⋮ | ⋮ | ⋮ | ⋮ |
| 122 | 30 | 2 | 0x1FFFFFFF | 1 |
| 123 | 30 | 3 | 0x1FFFFFFF | 1 |
| 124 | 31 | 0 | 0x1FFFFFFF | 1 |
| 125 | 31 | 1 | 0x1FFFFFFF | 1 |
| 126 | 31 | 2 | 0x1FFFFFFF | 1 |
| 127 | 31 | 3 | 0x1FFFFFFF | 1 |

FIG. 12

RAID GROUP MANAGEMENT TABLE 82

| GROUP IDENTIFIER (VDEV) 821 | MASTER DISK ADAPTER NUMBER 822 | RAID LEVEL 823 | COMPONENT PDEV 824 | NEW COMPONENT PDEV 825 | |
|---|---|---|---|---|---|
| 0 | 0 | 5 | {0, 32, 64, 96} | {28, 32, 64, 96} | 820-1 |
| 1 | 0 | 5 | {1, 33, 65, 97} | {29, 33, 65, 97} | 820-2 |
| 2 | 0 | 5 | {2, 34, 66, 98} | {30, 34, 66, 98} | |
| 3 | 0 | 5 | {3, 35, 67, 99} | {31, 35, 67, 99} | |
| 4 | 1 | 5 | {4, 36, 68, 100} | | |
| 5 | 1 | 5 | {5, 37, 69, 101} | | |
| 6 | 1 | 5 | {6, 38, 70, 102} | | |
| 7 | 1 | 5 | {7, 39, 71, 103} | | |
| 8 | 0 | 5 | {8, 40, 72, 104} | | |
| ⋮ | ⋮ | ⋮ | ⋮ | | |
| 14 | 0 | 1 | {14, 46} | | |
| 15 | 0 | 1 | {15, 47} | | |
| ⋮ | ⋮ | ⋮ | ⋮ | | |

FIG. 15

DATA REGENERATION MANAGEMENT TABLE 83

| AREA NUMBER | LOGICAL BLOCK ADDRESS ||  REGENERATION FLAG |
|---|---|---|---|
| | FROM | TO | |
| 0 | 0x00000000 | 0x0000FFFF | 1 |
| 1 | 0x00010000 | 0x0001FFFF | 1 |
| 2 | 0x00020000 | 0x0002FFFF | 1 |
| 3 | 0x00030000 | 0x0003FFFF | 1 |
| 4 | 0x00040000 | 0x0004FFFF | 0 |
| 5 | 0x00050000 | 0x0005FFFF | 0 |
| 6 | 0x00060000 | 0x0006FFFF | 0 |
| 7 | 0x00070000 | 0x0007FFFF | 0 |
| 8 | 0x00080000 | 0x0008FFFF | 0 |
| 9 | 0x00090000 | 0x0009FFFF | 1 |
| 10 | 0x000A0000 | 0x000AFFFF | 0 |

DISK ARRAY SYSTEM AND FAILURE RECOVERING CONTROL METHOD

BACKGROUND OF THE INVENTION

1. Field of the Invention

The present invention relates to a disk array system and a failure recovering control method, further detailedly relates to a disk array system of a redundant array of inexpensive disks (RAID) type which forms one logical group by a plurality of disk drives including a redundant disk drive to prepare for the failure of any disk drive and a failure recovering control method.

2. Description of the Related Art

A high-performance computer system is provided with a secondary mass storage and reads and writes data required by a host system such as CPU from and to the secondary storage at any time. For the secondary storage, for example, a disk unit having a nonvolatile storage medium that enables random access such as a magnetic disk and an optical disk is general and recently, a disk array system composed of multiple small-sized disk drives (hereinafter called merely drives) to increase storage capacity is mainstream.

In the disk array system, a RAID system in which one logical group is formed by a plurality of drives including at least one redundant drive to prepare for the failure of any drive for each logical group is adopted.

RAID has standardized some levels For example, in a disk array system of RAID 1 (a level 1), a redundant drive or a spare drive is prepared for each drive for storing data and, by writing the same data to the two drives in parallel usually, required data can be read out from the spare drive paired with the data drive even if failure occurs in any data drive.

At RAID 3 (a level 3), one logical group which may be also called a parity group or a RAID group is formed by (N+1) pieces of drives (N≧2), one of them is used for a redundant drive for storing error correction information (hereinafter represented by parity) and the rest are used for drives for storing data. In this specification, error correction information is represented by parity, however, it is clear that another information except parity can be applied to error correction information generated in each logical group.

In the disk array system of RAID 3, when a request to write a data block is issued from a host system, the data block to be written is divided into a plurality of data sub-blocks of fixed length (for example, 1-byte length) and these data sub-blocks are sequentially distributed and stored to the N pieces of data storing drives. In the redundant drive, error correction information generated based upon the N pieces data sub-blocks belonging to the same logical group and having the same address in the respective data storing device is stored. When a request to read a data block is issued from the host system, an original data block is reconstituted by reading out data sub-blocks in parallel from N pieces of data storing drives and joining these data sub-blocks in predetermined order.

At RAID 4 (a level 4), one logical group is also formed by (N+1) pieces of drives (N≧2), one of them is used for a redundant drive for storing error correction information and the rest are used for data storing drives. However, in a disk array system of RAID 4, when a request to write a data block is issued from a host system, data is written in a way that a data block related to one request to write is stored in one of data storing drives and a data block related to the next request to write is stored in another data storing drive, for example. Therefore, in a redundant drive, error correction information generated based upon data divisions which have the same storing address in the respective data storing drives and belong to separate data blocks is stored.

At RAID 5 (a level 5), as at the level 4, data is written in a data block unit related to one request to write. However, as an area for storing error correction information is not fixedly allocated to a specific disk drive as at the level 4 but is dispersively allocated to plural (N+1) disk drives forming a logical group.

In the disk array systems of RAID 3 to RAID 5, when failure occurs in any drive, data or error correction information (for example, parity data) held in a faulty drive can be regenerated based upon data read out from the other drives that belong to the same logical group as the faulty drive.

In the above-mentioned disk array system, in order to increase memory capacity and to miniaturize body size, it is required to mount multiple drives as many as possible in small space. Generally, system configuration that a plurality of control boards each mounting control LSI chips thereon and multiple drive boards each mounting a plurality of drives thereon are inserted into connectors arranged in parallel on a mother board, and each drive is connected to a disk channel wiring on the mother board via individual wiring on the drive board is adopted.

In this configuration, in order to detach only a faulty drive from a drive board to replace with a new drive in the occurrence of failure in the drive, free space sufficient for replacing the faulty drive is necessary between drive boards adjacent to each other. As a result, the packaging density of drive boards on the mother board is deteriorated.

For prior art in view of this problem, for example, Japanese published unexamined patent Publication No. Hei7-230362 (a patent document 1) proposes a disk array system that multiple drive boards are mounted on a mother board at high density, a drive board (a faulty board) on which a faulty drive is mounted is detached from the mother board when failure occurs in the drive, the faulty drive is replaced with a normal drive outside the system, and the drive board with the replaced component is connected to the mother board again.

According to the configuration, not only the faulty drive but a plurality of normal drives mounted on the faulty board are detached from the disk array system until the faulty component has been replaced.

For that reason, in the patent document 1, each logical group is formed by (N+1) pieces of drives mounted on different drive boards. When a read request to read out data stored in the faulty drive or a drives made absent by the detachment of the faulty board is issued from a host system, data blocks are read out from the other plural drives that belong to the same logical group as the faulty drive or the absent drive and required data is regenerated based upon the data blocks.

Besides, the patent document 1 proposes to store in a cache memory provided to a disk controller, write data requested to write in a faulty drive before a faulty board is detached and write data requested to write in the faulty drive or a plurality of normal drives which are made absent after the faulty board is detached. The data stored in the cache memory is written into the corresponding drives on the recovered board when the drive board having been replaced the faulty component with a normal component is connected to the mother board again. Lost data made unreadable by the detachment of the faulty board is regenerated based upon data read out from the rest plural drives that belong to the same logical group as the detached drive when the drive board is connected again and is written into a substitution drive on the recovered board.

In the above-mentioned patent document 1, it is further proposed to prepare a spare drive corresponding to each logical group, to temporarily store data, which is requested from the host system to write in the absent drive, in the spare drive in place of the cache memory, and to copy the data from the spare drive to the corresponding drive on the recovered board when the drive board having been replaced the faulty component with a normal component is connected to the mother board again. Besides, when stored data in the spare drive in place of the faulty drive becomes large quantities, it is also proposed that the spare drive may be continuously utilized as a normal drive by regenerating the lost data of the faulty drive based upon data read out from the other plural drives that belong to the same logical group as the spare drive or the faulty drive when the drive board having been replaced the faulty component with a normal component is connected again and writing the regenerated data to the spare drive.

It can be said that the disk array system proposed in the patent document 1 has hardware configuration suitable for miniaturizing body size and increasing memory capacity, however, when a data read request is issued from the host system while the faulty board is detached, operation for regenerating data based on the logical group is required for not only the faulty drive but for a plurality of normal drives made absent, and such a problem that a response to a data read request is delayed is caused while the faulty board is detached from the disk array.

Further, in the above-mentioned prior art, as the operation for transferring data from the cache memory or the spare drive to the drive on the recovered board and the operation for regenerating lost data in the faulty drive are executed when the drive board having replaced the faulty component is inserted to the mother board again, the return to a normal state of the disk array system is delayed.

SUMMARY OF THE INVENTION

The object of the invention is to provide a disk array system and a failure recovering control method suitable for miniaturizing body size of the disk array and increasing memory capacity.

Another object of the invention is to provide a disk array system and a failure recovering control method capable of retuning to a normal state promptly even if failure occurs in a drive.

Further another object of the invention is to provide a disk array system and a failure recovering control method allowable sufficient work time in replacing a faulty drive by maintenance personnel when failure occurs in the drive.

To achieve the objects, the disk array system and the failure recovering control method according to the invention are characterized in that when failure occurs in one of disk drives composing the disk array, data in a plurality of disk drives on a faulty board on which the faulty drive is mounted is regenerated in substitution disk drives and after the reorganization of logical groups is completed, the faulty board is replaced.

Data stored in the faulty drive is required to be regenerated based upon data read out from the other drives that belong to the same logical group as the faulty drive. However, as for data stored in the normal drives on the faulty board, data in the normal drives on the faulty board has only to be copied into the substitution disk drives as it is, the transfer of the data from the normal drives to the substitution disk drives can be completed in short time. According to the invention, as the faulty board is replaced after the reorganization of the logical groups is completed, normal data reading/writing is enabled even while the faulty board is detached from the disk array, and there is no need to regenerate data in the absent drive based on the logical groups as in the prior art when read/write command is executed.

More particularly, a disk array system according to the invention is composed of a disk controller connected to a host system via a channel path, a maintenance terminal connected to the disk controller and a disk array connected to the disk controller via a disk channel, the disk array being composed of a plurality of drive boards each mounting thereon a plurality of disk drives connected to wiring on the board and a common board provided with a plurality of connectors for connecting the wiring on each of the drive boards to wiring for the disk channel, the plurality of drive boards being detachably mounted on the common board via the. plurality of connectors, wherein the disk controller defines a part of the drive boards in the disk array as spare boards and the rest as active boards, manages (N+1) pieces of disk drives ($N \geq 2$) mounted on different drive boards in a group of active drive boards as a logical group, dispersively allocates a memory area for storing error correction information generated in each logical group to the (N+1) pieces of disk drives or fixedly allocates the memory area to a specific disk drive, and controls the writing and the reading of data in the disk array.

A feature of the invention resides in that the disk controller is provided with means for reorganizing logical groups when failure occurs in any active disk drive in the disk array, after storing the same data as that stored in disk drives on the faulty board on which a faulty drive is mounted into disk drives on a substitution board selected from among the group of spare drive boards so that each logical group to which one of disk drives on the faulty board belongs includes a new disk drive on the substitution board in place of the disk drive on the faulty board, and means for informing the maintenance terminal that the faulty board is replaceable after the reorganization of the logical groups is completed.

According to one embodiment of the invention, the means for reorganizing the logical groups comprises means for writing data regenerated based upon data read out from the other plural disk drives that belong to the same logical group as the faulty drive into one of the substitution disk drives on the substitution board in place of the faulty drive, and means for sequentially copying data read out from normal disk drives mounted on the faulty board into the other of the substitution disk drives on the substitution board.

The invention is also characterized in that the common board is provided with a plurality of bypass circuits for selectively bypassing each connector for connecting to a drive board from wiring for the disk channel, and the disk controller is provided with means for switching one of the bypass circuits corresponding to the connector of the faulty board to a bypassed state after the reorganization of logical groups is completed.

The invention is further characterized in that the disk controller has a board management table for managing each of the drive boards forming the disk array according to a status code that changes in the order of a normal state, an exchange waiting state and a spare state, and manages a board in a normal state as an active board and a board in a spare state as a spare board.

According to one embodiment of the invention, the connectors for connecting with the drive boards are located on the common board in two-dimensional arrangement having coordinate values on the X-axis and the Y-axis, and the plurality of disk drives are arranged on each drive board in a direction of the Z-axis, the disk controllers defines each of logical groups by (N+1) pieces of disk drives each having the same X coordinate value, the same Z coordinate value and different Y coordinate value. Further, the means for reorganizing logical groups selects, as a substitution board, a drive board having the same Y coordinate value as that of a faulty board from among a group of spare drive boards and correlates the disk drives on the faulty board and substitution disk drives on the substitution board according to respective Z coordinate values.

A failure recovering control method in the disk array system according to the invention comprises the steps of: selecting a substitution board to be used in place of a faulty board on which a faulty drive is mounted from among a group of spare drive boards when failure occurs in any active disk drive in the disk array; storing the same data as that stored in each disk drive on the faulty board into disk drives on a substitution board selected from among a group of spare drive boards; reorganizing logical groups to each of which a disk drive on the faulty board belongs in new configuration including a new disk drive on the substitution board in place of the disk on the faulty board; and informing a maintenance terminal that the faulty board is replaceable after the logical groups are reorganized.

The other features of the invention will be clarified by the description of the following embodiments referring to the drawings.

BRIEF DESCRIPTION OF THE DRAWINGS

FIG. 10 shows the configuration of a board management table 80 to be referred to in a failure recovering process;

FIG. 11 shows the configuration of a drive management table 81 to be referred to in the failure recovering process;

FIG. 12 shows the configuration of an RAID group management table 82 referred in the failure recovering process;

FIG. 15 shows the configuration of a data regeneration management table to be referred to in the data regenerating and copying routine 220;

DESCRIPTION OF THE PREFERRED EMBODIMENTS

Figure 1:
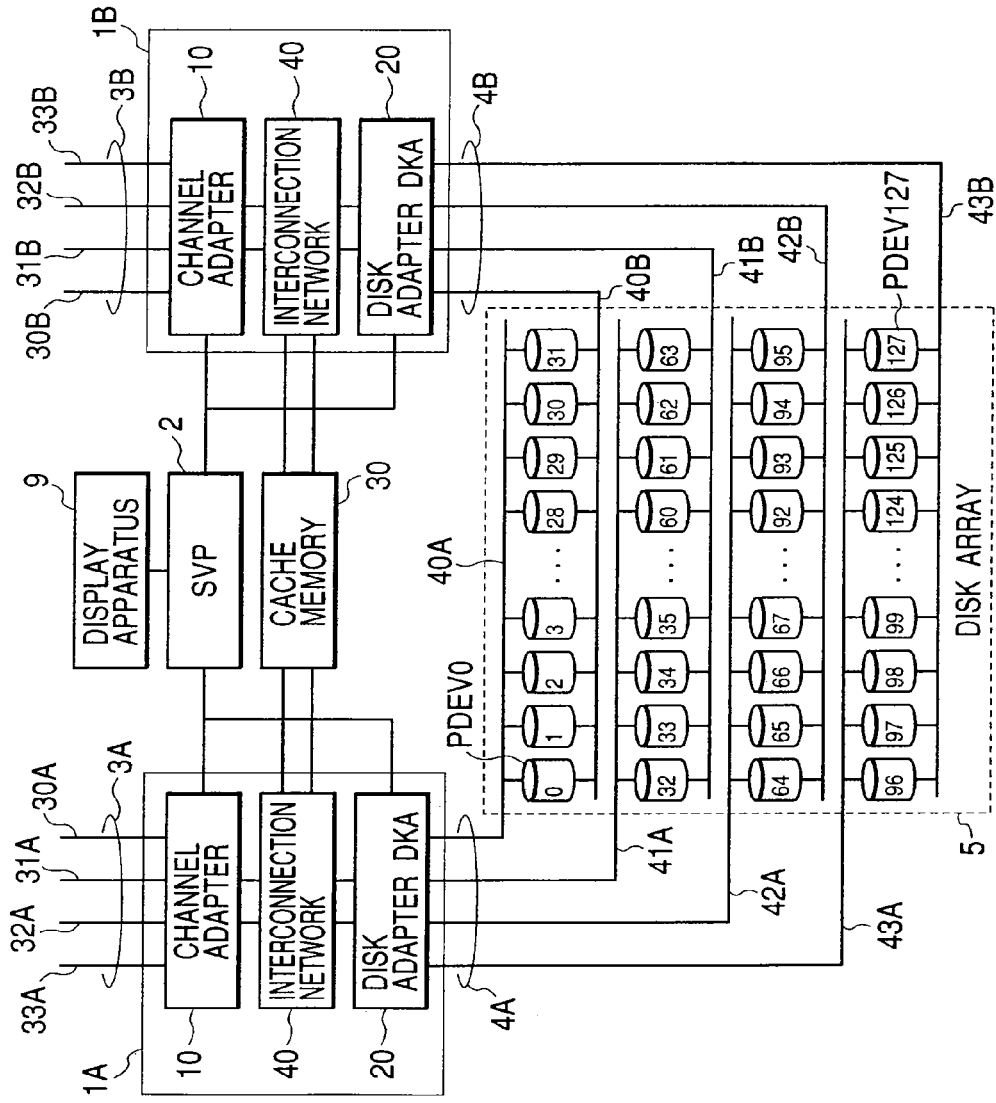
FIG. 1 shows an embodiment of a disk array system to which the invention is applied.

Referring to the drawings, embodiments of the invention will be described below.

FIG. 1 shows an embodiment of a disk array system to which the invention is applied.

The disk array system shown in FIG. 1 has redundant configuration that two disk controllers 1A, 1B access a disk array 5 composed of a plurality of disk drives. These disk controllers 1A, 1B are connected to a service processor (SVP) 2 provided with a display apparatus 9. The disk controller 1A is composed of a channel adapter 10 connected to CPU (not shown) as a host system via a plurality of channel paths 3A (30A to 33A), a disk adapter (DKA) 20 connected to the disk array 5 via a plurality of disk channels 4A (40A to 43A) including a signal line for bypass control described later and an interconnection network 40 mutually connecting these components.

In this embodiment, description will be made on the premise that the number of disk drives forming each logical group (hereinafter called a RAID group) is four and the number of logical units of each disk drive is one. However, the invention does not limit the number of drives forming the RAID group and the number of logical units of each disk drive to those in this embodiment.

The disk array 5 is composed of a plurality of disk drives PDEV0 to PDEV127, these disk drives are divided into four drive groups (the zeroth group: PDEV0 to PDEV31, the first group: PDEV32 to PDEV63, the second group: PDEV64 to PDEV95, and the third group: PDEV96 to PDEV127) corresponding to each disk channel and each drive group is connected to one of the disk channels 40A to 43A, 40B to 43B corresponding to each drive group. The disk controller 1B also has the similar configuration to that of the disk controller 1A and the disk adapter 20 of the disk controller 1B is connected to the disk array 5 via the disk channels 4B (40B to 43B). A cache memory 30 is connected to each interconnection network 40 in the disk controllers 1A, 1B and can be accessed from both of the disk controllers 1A, 1B.

Figure 2:
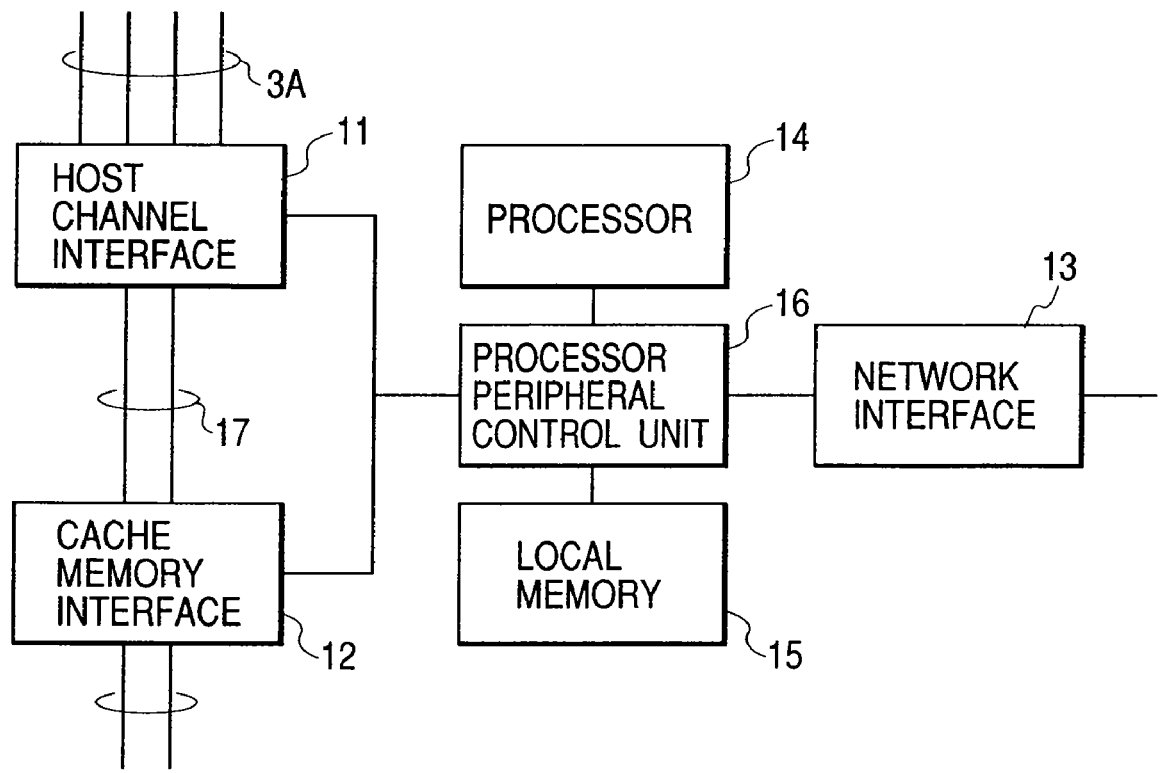
FIG. 2 is a block diagram showing the configuration of a channel adapter 10.

FIG. 2 shows the configuration of the channel adapter 10.

The channel adapter 10 is composed of a host channel interface 11 connected to the channel path 3A, a cache memory interface 12 connected to the interconnection network 40, a network interface 13 for connecting to SVP 2, a processor 14 for controlling data transfer between the disk array system and CPU, a local memory 15 for storing various tables to be referred to and software to be executed by the processor, and a processor peripheral control unit 16 for mutually connecting these components.

The host channel interface 11 is provided with a conversion function between a control protocol on the channel path 3A and a control protocol inside the disk controller, and a signal line 17 connects the host channel interface 11 and the cache memory interface 12.

Figure 3:
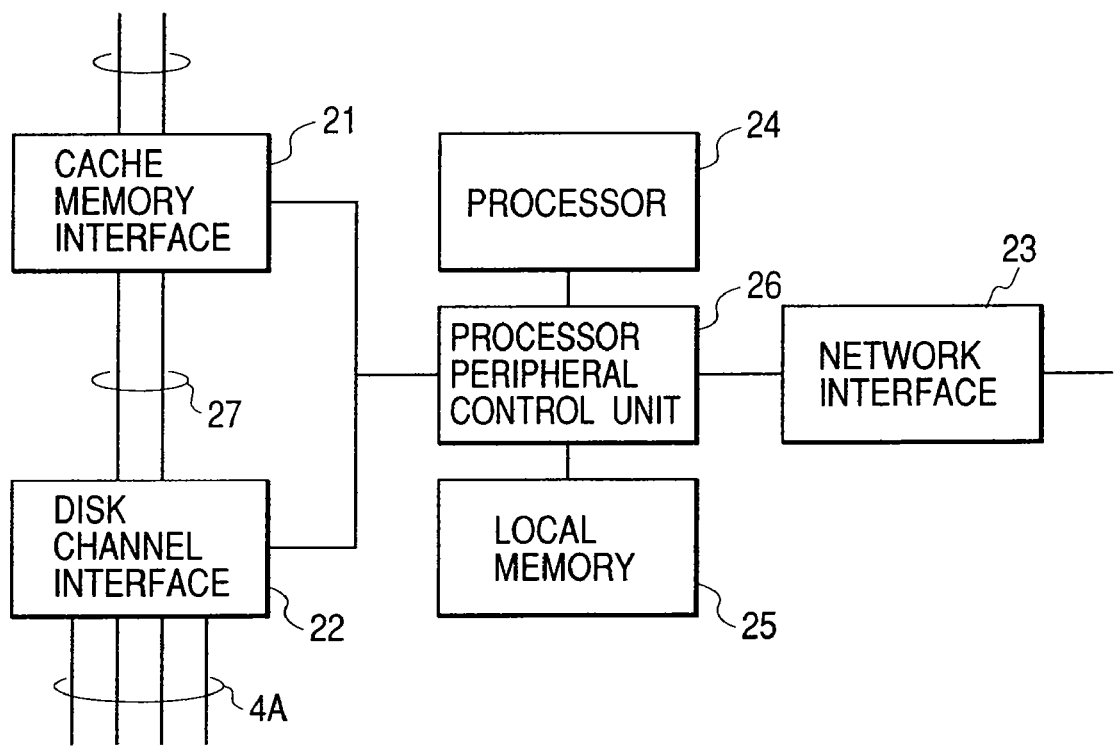
FIG. 3 is a block diagram showing the configuration of a disk adapter 20.

FIG. 3 shows the configuration of the disk adapter 20.

The disk adapter 20 is composed of a cache memory interface 21 connected to the interconnection network 40, a disk channel interface 22 connected to the disk channel 4A, a network interface 23 for connecting to SVP 2, a processor 24, a local memory 25 for storing various tables to be referred to and software to be executed by the processor, and a processor peripheral control unit 26 for mutually connecting these components.

The cache memory interface 21 and the disk channel interface 22 are connected via a signal line 27. The disk channel interface 22 is provided with a conversion function between a control protocol inside the disk controller and a control protocol on the disk channel 4A, for example SCSI.

Figure 4:
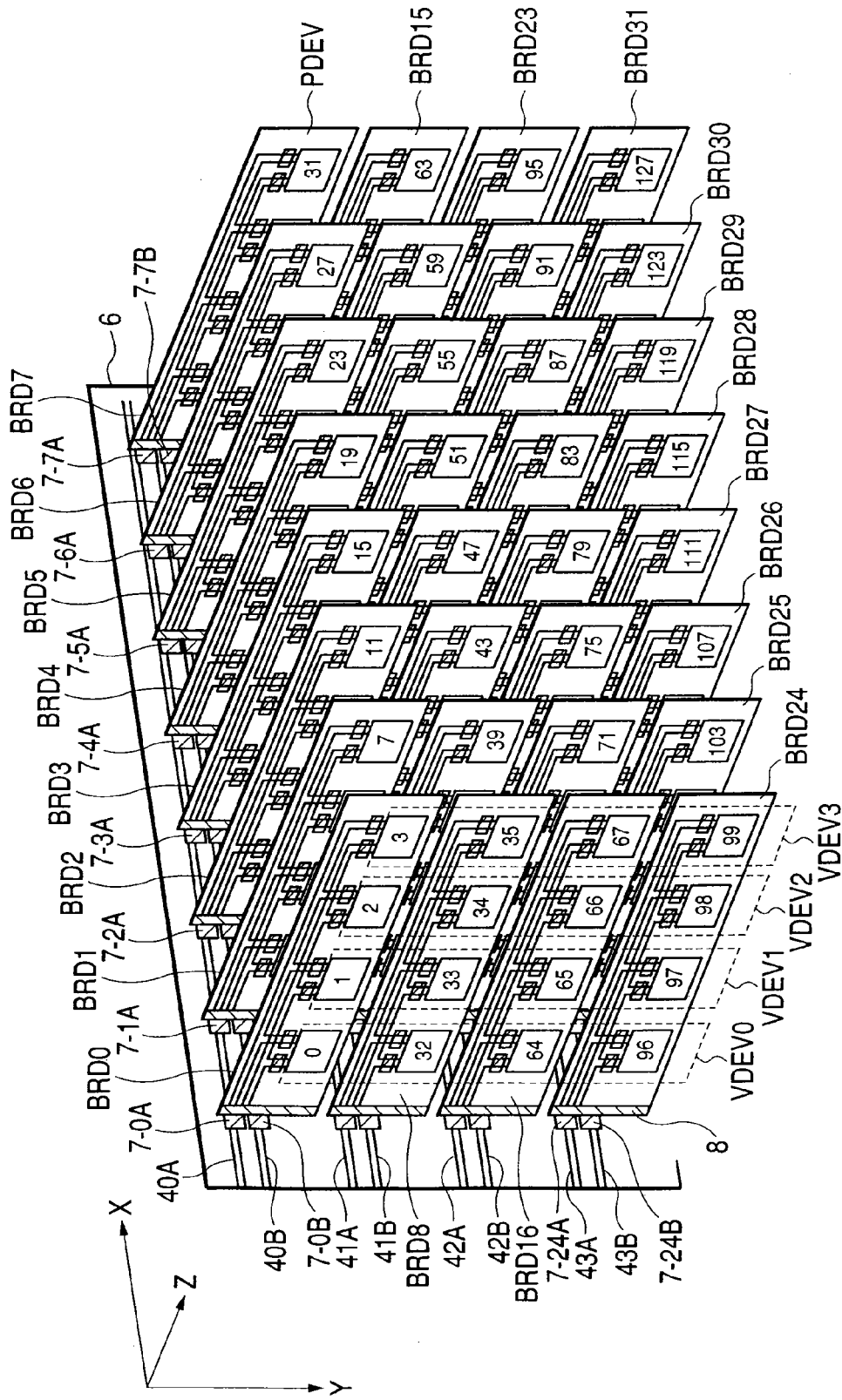
FIG. 4 is a perspective view showing an example of the packaging structure of a disk array 5 according to the invention.

FIG. 4 shows an example of packaging structure of the disk array 5 according to the invention.

The disk array 5 is composed of a plurality of drive boards BRD (BRD0 to BRD31) detachably mounted on a group of connectors 8 on a mother board (a common board) 6 and four disk drives PDEV(i) to PDEV(i+3) are mounted on each drive board BRD in this embodiment. On the mother board 6, actually, other plural boards such as a control board mounting thereon various LSI chips forming the channel adapter 10 and the disk adapter 20 and a memory board mounting thereon memory LSIs for the cache memory 30 are mounted in addition to the above-mentioned drive boards. However, only the drive boards will be described here.

When the X-, Y- and Z-axes are set on the disk array 5 with the left upside of the mother board as origin and attention is paid to the drive boards arranged along the X-axis, the disk drives PDEV0 to PDEV31 mounted on the drive boards BRD0 to BRD7 at the uppermost stage (Y=0) are equivalent to the disk drives of the zeroth group shown in FIG. 1. These disk drives of the zeroth group are connected to zeroth disk channels 40A, 40B on the mother board 6 via port bypass circuits (PBC) 7-0A to 7-7A, 7-0B to 7-7B.

Similarly, the disk drives PDEV32 to PDEV63 of the first group mounted on the drive boards BRD8 to BRD15 at a second stage (Y=1) are connected to first disk channels 41A, 41B on the mother board 6, the disk drives PDEV64 to PDEV95 of the second group mounted on the drive boards BRD16 to BRD23 at a third stage (Y=2) are connected to second disk channels 42A, 42B on the mother board 6, and the disk drives PDEV96 to PDEV127 of the third group mounted on the drive boards BRD24 to BRD31 at a fourth stage (Y=3) are connected to third disk channels 43A, 43B on the mother board 6.

In the disk array 5, as shown by a broken line in the four drive boards BRD0, BRD8, BRD16, BRD24 arranged along the Y-axis at the left end, each RAID group is formed by vertically arranged four disk drives having the same X coordinate value and the same Z coordinate value. In this embodiment, RAID groups formed by the disk drives on the drive boards BRD0, BRD8, BRD16, BRD24 are called VDEV0 to VDEV3 in the order of Z coordinate. Besides, RAID groups are called VDEV4, VDEV5, VDEV6, VDEV7, - - - , VDEV31 in the order of the Z coordinate in a direction of X coordinate and numerals 0, 1, 2, - - - in these RAID group names are defined as an RAID group identifier.

In each RAID group, a parity drive is dispersed, for example, by dividing the memory space of each disk drive into a plurality of striped areas and assigning the memory area for storing error correction information (hereinafter represented by parity) to different disk drive depending upon the striped area.

In actual application, all disk drives included in the disk array 5 are not incorporated in RAID groups and some of them are in a stand-by state as spare drives. In the following description, the vertical two columns of drive boards BRD6 to BRD30, BRD7 to BRD31 located at the right end of the disk array 5 are used as spare boards. When failure occurs in any disk drive on any active drive board, one of the spare boards is selected as a substitution board to be used in place of the faulty board and disk drives on the substitution board are incorporated in active RAID groups.

Figure 5:
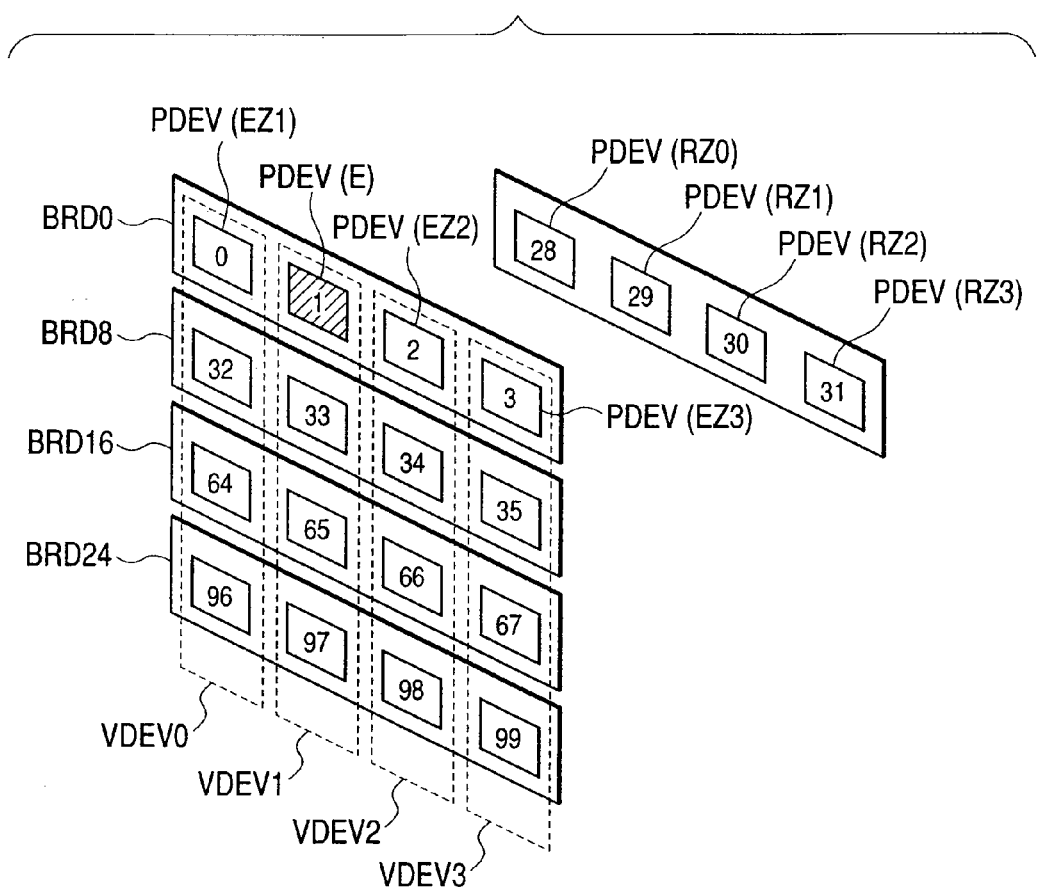
FIG. 5 shows relation between RAID groups to be reorganized according to the invention and a substitution board in the case where abnormality occurs in a disk drive.
Figure 6:
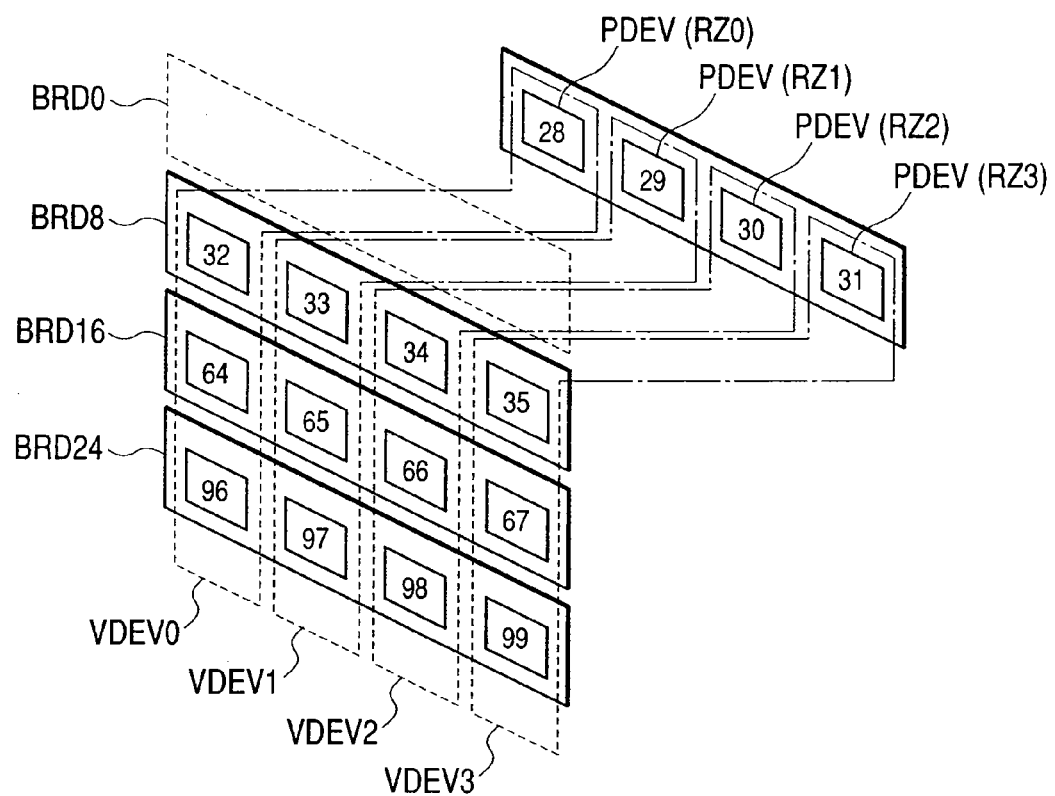
FIG. 6 shows the configuration of RAID groups after reorganization.

FIGS. 5 and 6 are drawings for explaining an RAID group reorganizing method in the case where failure occurs in one of active disk drives in the disk array 5 according to the invention, for example, in a second disk drive from the left on the disk board BRD0.

In the disk array 5 according to the invention, as a plurality of disk drives mounted on the same disk board belong to separate RAID groups, RAID groups are also reorganized for normal disk drives mounted on the same disk board before the disk board including a faulty drive is detached from the mother board when failure occurs in any disk drive.

As shown in FIG. 5, when the disk drive having a drive number 1 on the disk board BRD0 becomes a faulty drive PDEV(E), the RAID group VDEV1 to which PDEV (E) belongs becomes an abnormal RAID group. In this case, as normal disk drives PDEV(EZ1), PDEV(EZ2), PDEV(EZ3) respectively having drive numbers 0, 2, 3 mounted on the disk board BRD0 are apart from normal RAID groups VDEV0, VDEV2, VDEV3 to which the respective disk drives belong when the faulty board BRD0 is detached from the mother board 6, the reorganization of RAID groups is also required for these normal disk drives PDEV(EZ1), PDEV(EZ2), PDE-V(EZ3). In this specification, normal disk drives requiring reorganization of the RAID groups because of the detachment of the faulty board are called involved drives.

The feature of the invention resides in that not only for the faulty drive PDEV(E) but also for the involved drives PDEV (EZ1), PDEV(EZ2), PDEV(EZ3) RAID groups are reorganized in a failure recovering process. Therefore, out of groups of spare boards BRD6 to BRD30, BRD7 to BRD31, for example, the spare board BRD7 having the same Y coordinate value as that of the faulty board BRD0 is selected as a substitution board and the same data as that stored in each drive on the faulty board is written into each disk drive on the substitution board.

In this embodiment, as a result of the failure recovering process, as shown in FIG. 6, for example, RAID groups VDEV0 to VDEV3 are reorganized in a form including disk drives PDEV(RZ0) to PDEV(RZ3) on the substitution board. In this case, with respect to the substitution drive PDEV(RZ1) to be used in place of the faulty drive PDEV(E), data writing is sequentially performed after recovering lost data of the faulty drive PDEV(E) based upon data read out from the other normal drives forming the RAID group VDEV1, that is, disk drives respectively having drive numbers 33, 65, 97. On the other hand, involved drives can be normally accessed. Accordingly, with respect to the substitution drives PDEV (RZ0), PDEV(RZ2), PDEV(RZ3) to be used in place of the involved drives, data read out from corresponding involved drives has only to be sequentially copied.

Figure 7:
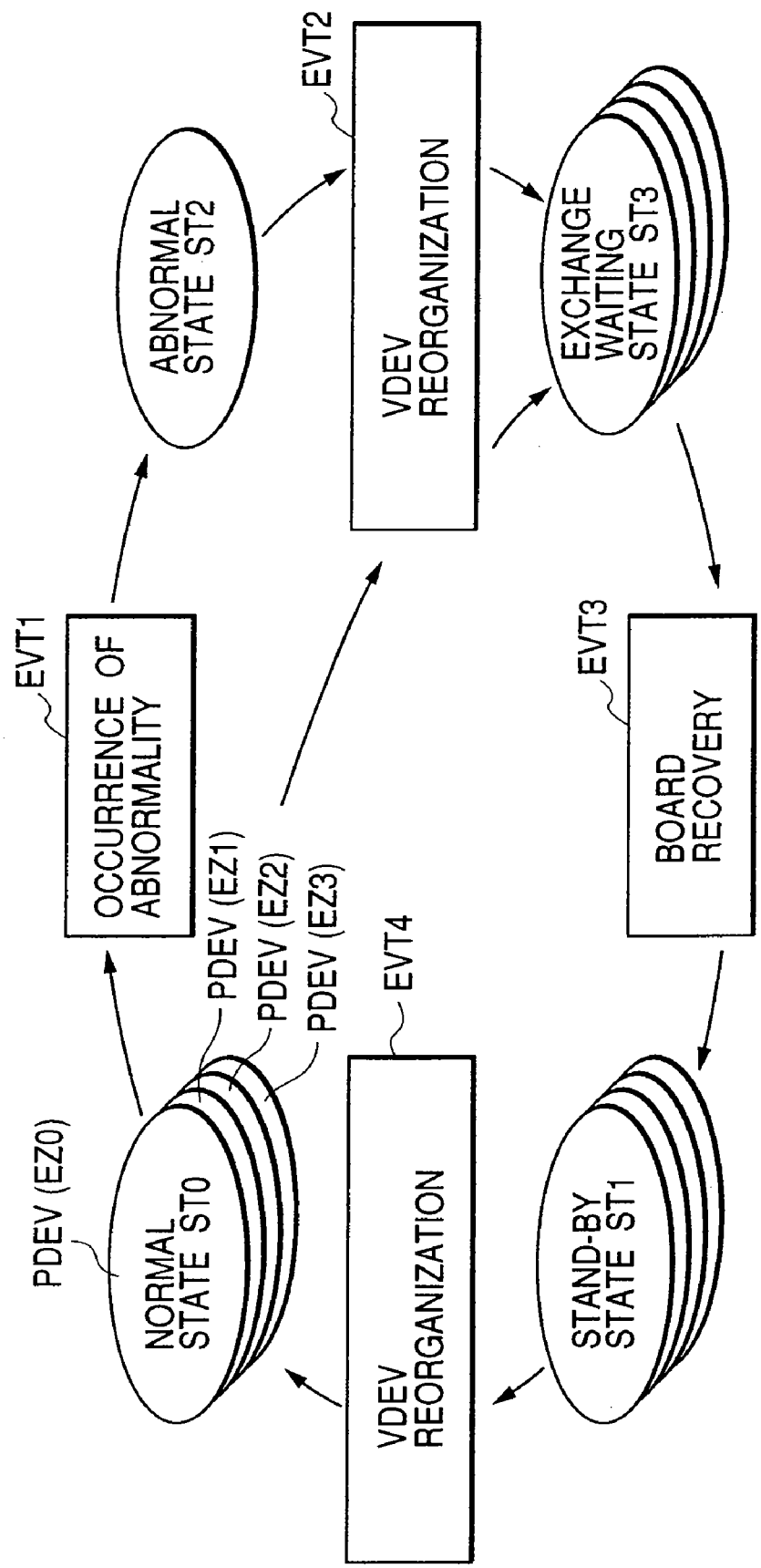
FIG. 7 is a drawing for explaining the state transition of a disk drive in the disk array according to the invention.

FIG. 7 shows the state transition of disk drives in the disk array 5 according to the invention.

The four disk drives PDEV(EZ0) to PDEV(EZ3) mounted on the same active drive board are operated at a normal state ST0 at first. When abnormality (EVT1) occurs in any drive, for example, in the disk drive PDEV(EZ0), a state code of the faulty drive PDEV(EZ0) changes to an abnormal state ST2.

When a substitution board in place of the faulty board is selected and the reorganization (EVT2) of RAID groups (VDEV) is completed, a state of each disk drive on the faulty board changes to an exchange waiting state ST3. When a normal board is inserted onto the mother board (EVT3) after the faulty board is removed from the mother board and parts are replaced, each disk drive PDEV(EZ0) to PDEV(EZ3) on the recovered board becomes a stand-by state ST1. These disk drives change to a normal state ST0 when abnormality occurs in another disk drive later and the disk drives are added to a group of active drives by the reorganization (EVT4) of RAID groups (VDEV).

Figure 8:
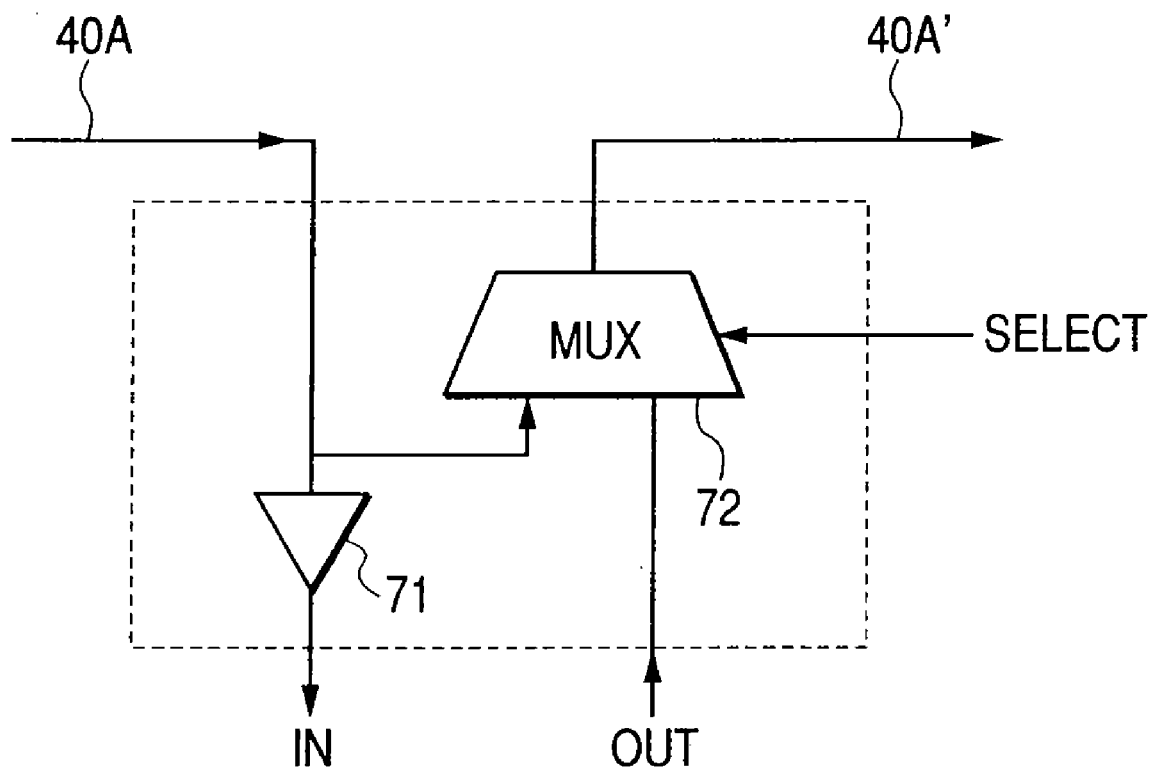
FIG. 8 shows the configuration of a port bypass circuit.

FIG. 8 shows the configuration of a port bypass circuit 7 for connecting a group of disk drives on a disk board to a disk channel.

Each disk channel forms an arbitrated loop serially connecting a plurality of disk drives. The port bypass circuit 7 functions as a connection port of disk drives or a drive board. The port bypass circuit 7 is composed of a driver circuit 71 for supplying a signal from an input circuit 40A of the disk channel (the arbitrated loop) to the input terminal IN of the disk drive and a multiplexer 72 that selects either of the input signal from the input circuit 40A or a signal from the output terminal OUT of the disk drive and outputs it to an output circuit 40A' of the disk channel (the arbitrated loop).

The multiplexer 72 selects the output signal from the disk drive when a selection signal SELECT is "1", for example, selects the input signal from the input circuit 40A of the disk channel when the selection signal is "0" and supplies the selected signal to the next port via the output circuit 40A'.

Figure 9:
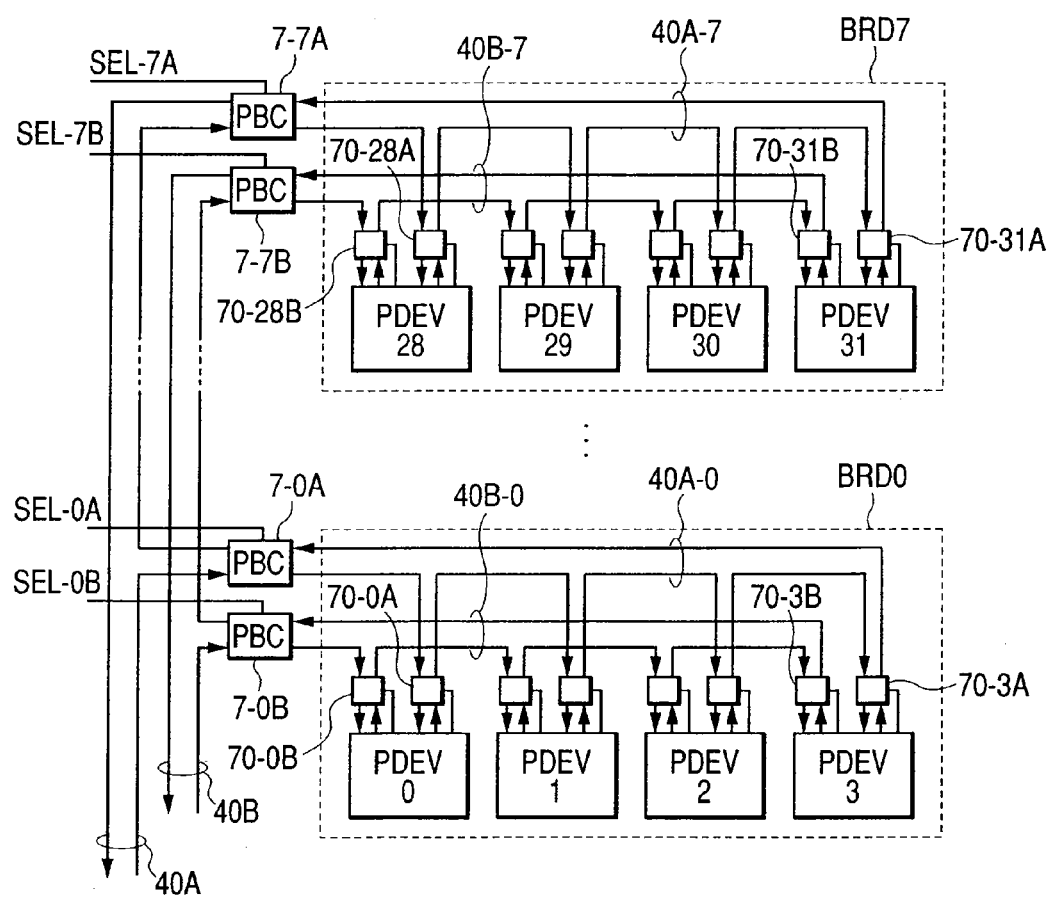
FIG. 9 shows the relation of connection between a group of disk drives and a disk channel.

FIG. 9 shows the relation of connection among the zeroth disk drives PDEV0 to PDEV31 and the zeroth disk channels 40A, 40B and bypass control signal lines SEL-0A to SEL-7A, SEL-0B to SEL-7B.

The zeroth disk channels 40A, 40B wired on the mother board 6 are provided with the port bypass circuits 7-0A to 7-7A, 7-0B to 7-7B located in each vicinity of the connectors with the zeroth drive boards BRD0 to BRD7, and are connected to arbitrated loops 40A-0 to 40A-7, 40B-0 to 40B-7 on the drive boards BRD0 to BRD7 via these port bypass circuits, respectively. These port bypass circuits are controlled by selection signals SEL (SEL-0A to SEL-7A, SEL-0B to SEL-7B).

In the meantime, the drive board BRD0 is provided with the arbitrated loop 40A-0 connected between the input and output terminals IN and OUT of the port bypass circuit 7-0A on the mother board and the arbitrated loop 40B-0 connected between the input and output terminals IN and OUT of the port bypass circuit 7-0B. The disk drives PDEV0 to PDEV3 mounted on the drive board BRD0 are provided with a pair of port bypass circuits (70-0A, 70-0B) to (70-3A to 70-3B). The port bypass circuits 70-0A to 70-3A are connected to the arbitrated loop 40A-0 and the port bypass circuits 70-0B to 70-3B are connected to the arbitrated loop 40B-0.

Each SELECT line of the port bypass circuits (70-0A, 70-0B) to (70-3A, 70-3B) on the drive board BRD0 is connected to a port bypass control line in the drives PDEV0-PDEV3 so that when any drive is inactive, the drive is bypassed from the arbitrated loops 40A-0, 40B-0. The disk drives on the other drive boards BRD1 to BRD7 also have the similar configuration to that of the disk drives on the drive board BRD0 and connected to a pair of arbitrated loops 40A-j, 40B-j (j=1 to 7) on the board.

As apparent from the configuration, the disk drives PDEV0 to PDEV31 that belong to the zeroth group are mutually connected in series via the disk channels (the arbitrated loops) 40A, 40B formed on the drive boards and on the mother board, and owing to it, the drive board having failure can be electrically bypassed from the disk channels 40A, 40B by turning the selection signal of the port bypass circuit that functions as a connection port with the faulty board to zero when the failure occurs in the disk drive.

FIG. 10 shows an example of a board management table 80 showing relation between the drive board and the disk drives mounted on the drive board in the disk array system according to the invention.

The board management table 80 includes a plurality of data entries 800-0 to 800-31 each having an identification number (BRD) 801 of the drive board. Each data entry shows the relation with the drive board identification number (BRD) 801, an X coordinate value 802 and a Y coordinate value 803 respectively indicating the position of the board in the configuration of the disk array shown in FIG. 4, a board status code 804 and the numbers 805 of the mounted disk drives (PDEV).

The value i of the status code 804 is rewritten according to the state transition STi (i=0 to 3) of the mounted disk drive shown in FIG. 7. Therefore, as shown in FIG. 10, in the case where no faulty drive exists in the disk array, the status code 804 has a value of "0" indicating that the drive is normally operated (the state ST0) as active drives or has a value of "1" indicating that the disk board is a spare board (the state ST1).

FIG. 11 shows an example of a drive management table 81 to be referred to in a failure recovering process in the disk array system according to the invention.

The drive management table 81 includes a plurality of data entries 810-0 to 810-127 each having a disk drive identification number (PDEV) 811. Each data entry shows the relation with the disk drive identification number (PDEV) 811, the number 812 of the drive board on which the disk drives are mounted, a Z coordinate value 813 indicating the mounting position of the disk drive on the drive board, the maximum logical block address 814 of a memory area of the disk drive and a disk drive status code 815. The value i of the status code 815 is also rewritten according to the state transition STi (i=0 to 3) shown in FIG. 7.

FIG. 12 shows an example of an RAID group management table 82 for defining components of the RAID groups in the disk array system according to the invention.

The RAID group management table 82 includes a plurality of data entries 820-0, 820-1,- - - each having an identification number (VDEV) 821 of the RAID group. Each data entry shows the relation with the RAID group identification number (VDEV) 821, a master disk adapter identification number 822, an RAID level 823, component PDEV 824 indicating drives forming the RAID group and new component PDEV 825 indicating drives forming a new RAID group defined when the RAID group is reorganized.

The master disk adapter identification number 822 indicates the disk adapter 20 on the side of the disk controller to be a master in the system configuration in which the two disk controllers 1A, 1B are connected to the disk array 5 as shown in FIG. 1. For the RAID group in which the master disk adapter identification number 822 is set to "0", the disk adapter 20 on the side of the disk controller 1A functions as a master, and for the RAID group in which the identification number 822 is set to "1", the disk adapter 20 on the side of the disk controller 1B functions as a master. In the case where failure occurs in the disk adapter 20 that functions as a master, the other disk adapter 20 accesses the disk array 5 in place of the faulty disk adapter.

The RAID level 823 indicates the RAID level applied to the RAID group. In the example shown in FIG. 12, RAID level 5 is applied to the RAID groups VDEV0 to VDEV8 and RAID level 1 is applied to VDEV14 and VDEV15.

A drive failure recovering process in the disk array system according to the invention will be described below.

Figure 13:
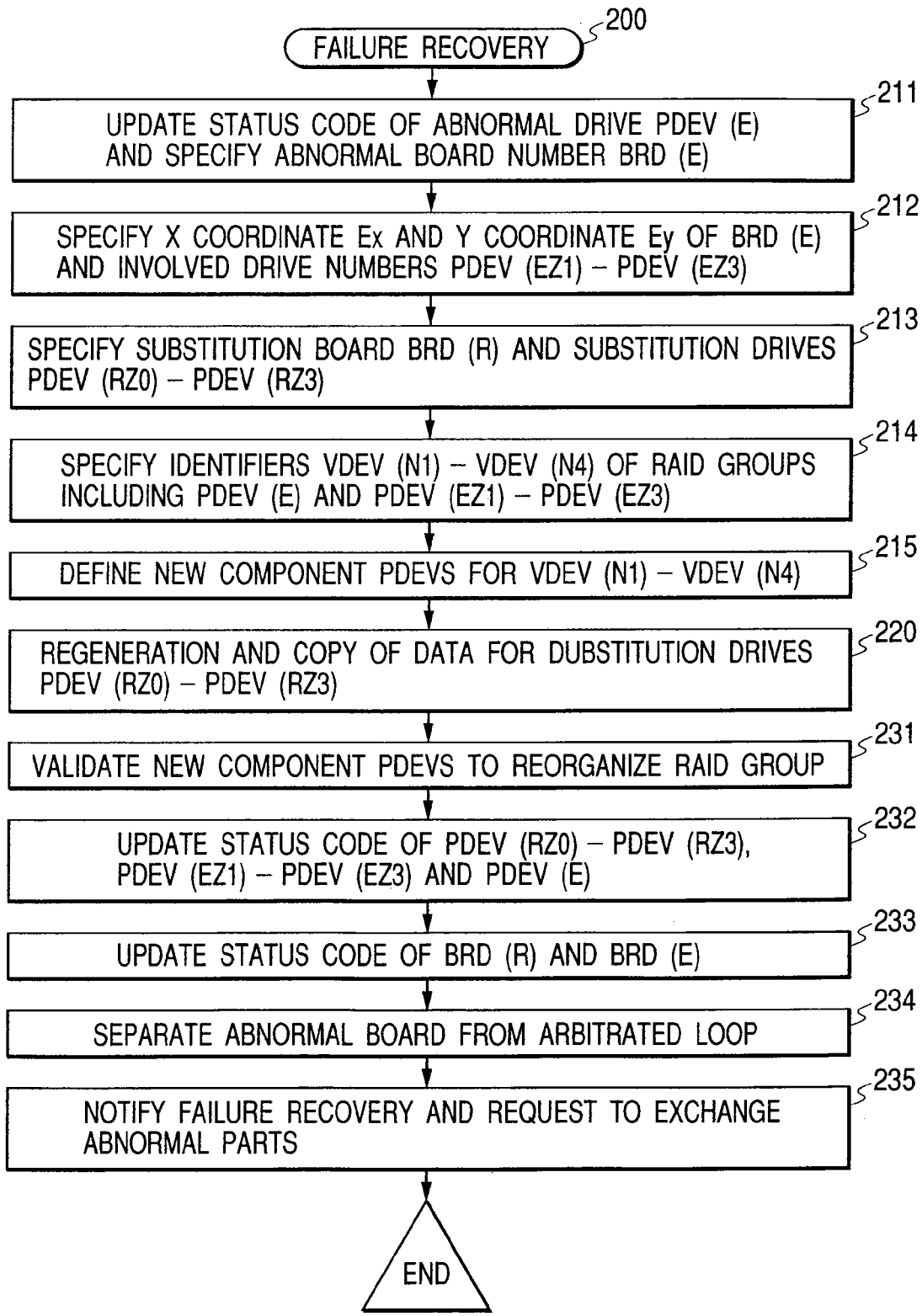
FIG. 13 is a flowchart showing an embodiment of a failure recovering routine 200 according to the invention.

FIG. 13 shows an embodiment of a failure recovering routine 200 executed by the processor 24 of the disk adapter 20 when failure is detected in the active disk drive.

The management tables 80 to 82 shown in FIGS. 10 to 12 are formed in the local memory 25 which are accessible from the processor 24 and are referred to while the failure recovering routine 200 is executed by the processor 24. However, these tables may be formed in the cache memory 30. The contents of the management tables 80 to 82 are monitored by maintenance personnel via SVP2, and the setting of a new entry and the change of entry contents are made any time.

When failure is detected in the active diskdrive such as when data cannot be read out though a predetermined repetition of retry, the processor 24 executes the failure recovering routine 200 after informing SVP2 of the occurrence of failure.

The processor 24 first retrieves the data entry 810-j corresponding to the faulty drive in the drive management table 81 based upon the identification number j of the faulty drive PDEV(E) in which failure occurs in READ/WRITE access, and changes the value of the status code 815 of the data entry 810-j to "2" indicating the abnormal state (ST2). The processor also specifies the value k of the identification number 812 of the faulty board BRD (E) on which the faulty drive is mounted from the data entry 810-j (step 211).

The processor 24 refers to the board management table 80 according to the identification number k of the faulty board BRD (E), specifies a value Ex of the X coordinate 802 and a value Ey of the Y coordinate 803 of the faulty board BRD(E) from the data entry 800-k, and specifies involved drive numbers PDEV (EZ1) to PDEV (EZ3) from the contents of the drive number field 805 (step 212). Next, the processor searches the board management table 80 for a data entry 800-y in which the value of the Y coordinate 803 is Ey and the status code 804 is "1" indicating the stand-by state, and specifies an identification number y of a substitution board BRD (R) to be used in place of the faulty board BRD(E) and identification numbers of substitution drives PDEV(RZO) to PDEV(RZ3) (step 213). The processor also searches the RAID group management table 82 for a data entry including the identification number of the faulty drive PDEV(E) in the component PDEV 824 and data entries each including as the component PDEV 824 the identification number corresponding to any of the involved drive numbers PDEV(EZ1) to PDEV(EZ3) specified in the step 212. Hereby, group identifiers VDEV(N1) to VDEV(N4) requiring reorganization are specified (step 214). In the following description, it is assumed that the RAID levels 823 of the RAID groups to be reorganized are all "5" (level 5).

The processor 24 defines a new combination including the identification numbers of the substitution drives PDEV(RZ0) to PDEV(RZ3) specified in the step 213 in the RAID group management table 82 in place of the identification numbers of the faulty drive PDEV(E) and the involved drives PDEV (EZ1) to PDEV(EZ3), as new component PDEV 825 of the data entry having the group identifier VDEV(N1) to VDEV (N4) specified in the step 214 (a step 215).

Figure 14:
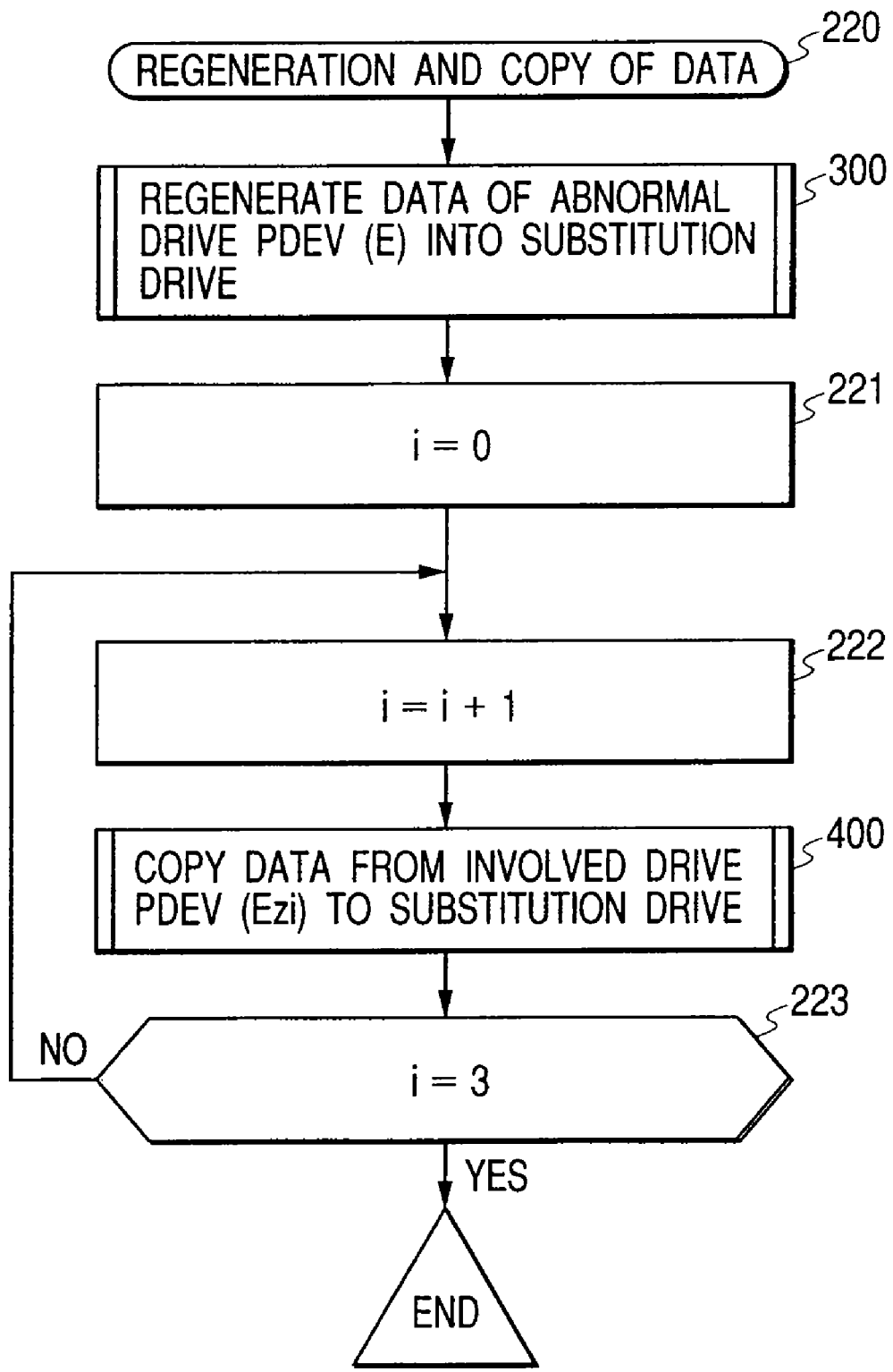
FIG. 14 is a detailed flowchart showing a data regenerating and copying routine 220 included in the failure recovering routine 200 shown in FIG. 13.

After that, the processor 24 executes a data regenerating and copying routine 220 for the substitution drives PDEV (RZ0) to PDEV(RZ3) described in detail in FIG. 14 and copies the contents of the new component PDEV 825 into the component PDEV 824 in the RAID group management table 82 when all data having been held on the faulty board BRD (E) can be regenerated into disk drives on the substitution board (step 231). The data of the new component PDEV is made valid by changing the contents of the component PDEV 824 and the reorganization EVNT2 of the RAID group PDEV shown in FIG. 7 is completed.

The processor 24 changes, as the post-processing of the reorganization of PDEVs, the value of the status code 815 of the data entries corresponding to the substitution drives PDEV(RZ0) to PDEV(RZ3) in the drive management table 81 to "0" indicating a normal state, and changes the value of the status code 815 of the data entry corresponding to the faulty drive PDEV(E) and the involved drives PDEV(EZ1) to PDEV(EZ3) to "3" indicating the exchange waiting state ST3 (step 232). Further, the processor changes the value of the status code 804 of the data entry corresponding to the substitution board BRD (R) in the board management table 80 to "0" indicating a normal state and the value of the status code 804 of the data entry corresponding to the faulty board BRD (E) to "3" indicating the exchange waiting state (step 233).

When the update of the contents of the table mentioned above is completed, the processor 24 switches the selection signal of the port bypass circuit for connecting the board specified by the coordinate values Ex, Ey of the faulty board BRD(E) so as to detach the faulty board from the disk channel (arbitrated loop)(step 234), and issues a control message for informing SVP 2 of the completion of the failure recovering process and requiring the exchange of the faulty component, specifying the faulty drive and the faulty board (step 235).

The contents of the control message are output to the display apparatus 9 of SVP2. Therefore, the maintenance personnel can detach the faulty board from the mother board according to the control message. After exchanging the faulty drive with a normal drive, the maintenance personnel connects the drive board to the mother board again. As the disk array is normally operated by reorganized RAID groups during the exchange of the components, the maintenance personnel is not required to be particularly in a hurry to exchange the components.

Utilizing an input device connected to the display apparatus 9, the maintenance personnel instructs the processor 24 of the disk adapter 20 to recover the faulty board after the normal board is connected to the mother board again. In response to an operation command from the maintenance personnel, the processor 24 changes the status code 804 of the entry corresponding to the recovered board in the board management table 80 and the status code 815 of the entry corresponding to the disk drives mounted on the recovered board in the drive management table 81 from "3" indicating the exchange waiting state to "1" indicating the stand-by state. Besides, the processor switches the status of a selection signal of the port bypass circuit specified by the coordinate values Ex, Ey of the recovered board BRD(E) so as to connect the drives mounted on the recovered board to the disk channel.

FIG. 14 shows an example of a detailed flowchart of the data regenerating and copying routine 220.

In the data regenerating and copying routine 220, the processor 24 executes a data regenerating process 300 for regenerating lost data stored in the failure drive (abnormal drive) PDEV(E) into a substitution drive PDEV(RZs) having the same Z coordinate value as that of the abnormal drive on a substitution board BRD(R). The details of the data regenerating process 300 will be described later by referring to FIG. 16.

After a value of a parameter i for counting the residual number of involved drives is cleared (step 221), the value of the parameter i is incremented (step 222). After that, the processor 24 executes a data copying routine 400 for sequentially reading out data stored in the i-th involved drive PDEV (EZi) selectedoutof drives PDEV(EZ1) to PDEV(EZ3) mounted on the faulty board BRD (E) except the abnormal drive PDEV(E), block by block, and for copying the read out data into the substitution drive PDEV(RZi) having the same Z coordinate value i as that of the i-th involved drive on the substitution board BRD(R). The details of the data copying process 400 will be described later by referring to FIG. 17.

When the data copying routine 400 is completed, the processor 24 checks whether the value of the parameter i reaches the number of the involved drives (three in this example) mounted on the board (step 223). If the value reaches the number of involved drives mounted on the board, the routine 220 is finished. Otherwise, control is returned to the step 222 and the similar process is repeated for the next involved drive.

FIG. 15 shows the configuration of a data regeneration management table 83 utilized by the processor 24 in the data regenerating process 300.

Figure 16:
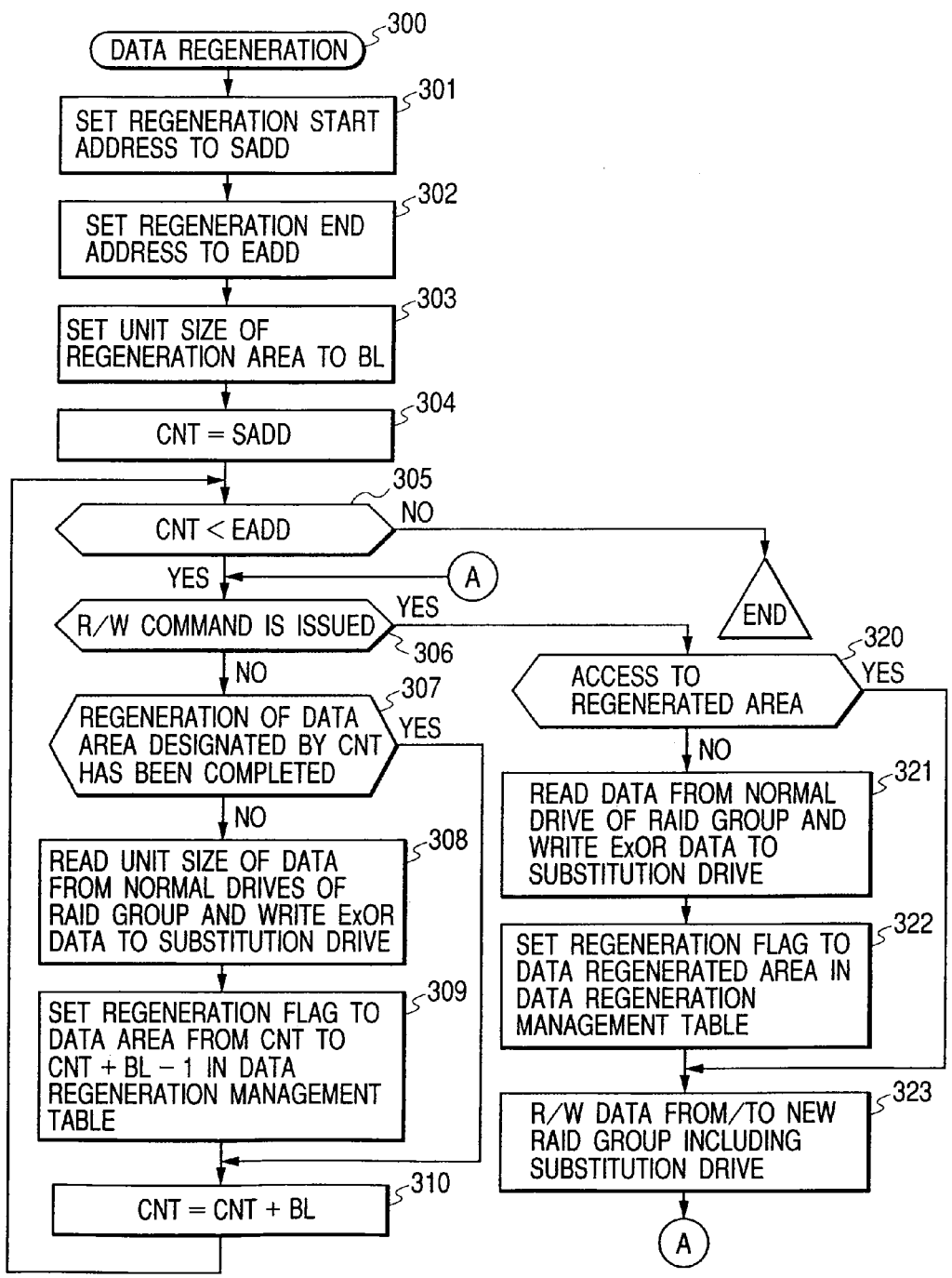
FIG. 16 is a detailed flowchart showing a data regenerating process 300 in the data regenerating and copying routine 220.

In the data regenerating process 300, as will be detailedly described in FIG. 16, the writing of regenerated data to the substitution drive PDEV(RZs) is repeated in units of area composed of a plurality of data blocks.

The data regeneration management table 83 includes a plurality of entries 830-0, 830-1, - - - each showing an area number 831 allocated to each memory area obtained by dividing the memory space of the substitution drive PDEV(RZs) into a plurality of sections, a logical block address 832 indicating the start address and the end address of the memory area and a regeneration flag 833. For a memory area to which regenerated data is written, a value "1" is set to the regeneration flag 833.

FIG. 16 shows an example of a detailed flowchart of the data regenerating process 300.

In the data regenerating process 300, the processor 24 sets a regeneration start address of the memory space of the substitution drive PDEV(RZs) to a parameter SADD as an initial value (step 301), sets a regeneration end address of the memory space of the substitution drive PDEV (RZs) to a parameter EADD (step 302), sets area size (or the number of data blocks) to be the unit of regeneration to a parameter BL (step 303) and sets the value of the parameter SADD to a parameter CNT for switching data regenerated areas (step 304). The area size defined by the parameter BL is equivalent to an address range shown by each logical block address 832 in the data regeneration management table 83.

Next, the processor 24 compares the values of the parameter CNT and EADD (step 305). If the value of CNT is equal to or larger than EADD, the routine is finished. In the case where the value of CNT is smaller than that of EADD, it is determined whether an access request (a READ/WRITE command) to the memory space of the abnormal drive PDEV (E) is issued from the host system (step 306). If there is no access request, by referring to the data regeneration management table 83, the regeneration flag 833 of a memory area specified by the parameter CNT is checked (step 307).

If the regeneration flag 833 is "1", the processor 24 adds the value of the block size BL to the parameter CNT (step 310) and returns the control to the step 305. In the case where the regeneration flag 833 is "0", the processor reads out data for one memory area specified by the parameters CNT and BL from the other normal disk drives of the RAID group to which the abnormal drive PDEV(E) already specified as the component PDEV 824 of the RAID group management table 82 belongs, and sequentially writes the result of the exclusive-OR (ExOR) of each bit of the read out data into the corresponding memory area of the substitution drive PDEV(RZs) (step 308).

After that, the processor 24 sets "1" to the regeneration flags 833 for the memory area specified by the parameter CNT in the data regeneration management table 83, that is, the data entry having the logical block address 832 from CNT to CNT+BL−1 (step 309) and executes the step 310.

If an access request from the host system is received in the step 307, the processor 24 refers to the data regeneration management table 83 to check whether the address range required by the access request corresponds to a memory area having completed data regeneration or not (step 320). If the memory area to be accessed corresponds to a memory area for which data has been already regenerated into the substitution drive, a READ/WRITE command is executed on a new RAID group including the substitution drive PDEV(RZS) (step 323) and after that, the step 306 is executed.

In the case where the memory area to be accessed corresponds to a memory area for which data is not regenerated yet, the processor 24 reads out data from the corresponding area in the other normal disk drives of the RAID group and sequentially writes the result of the exclusive-OR (EXOR) of each bit of the read out data into the corresponding memory area of the substitution drive PDEV(RZs) (step 321). After that, "1" is set to the regeneration flag 833 of the data entry corresponding to the above-mentioned memory area in the data regeneration management table 83 (step 322) and a READ/WRITE command is executed on a new RAID group including the substitution drive PDEV(RZs) in step 323.

Figure 17:
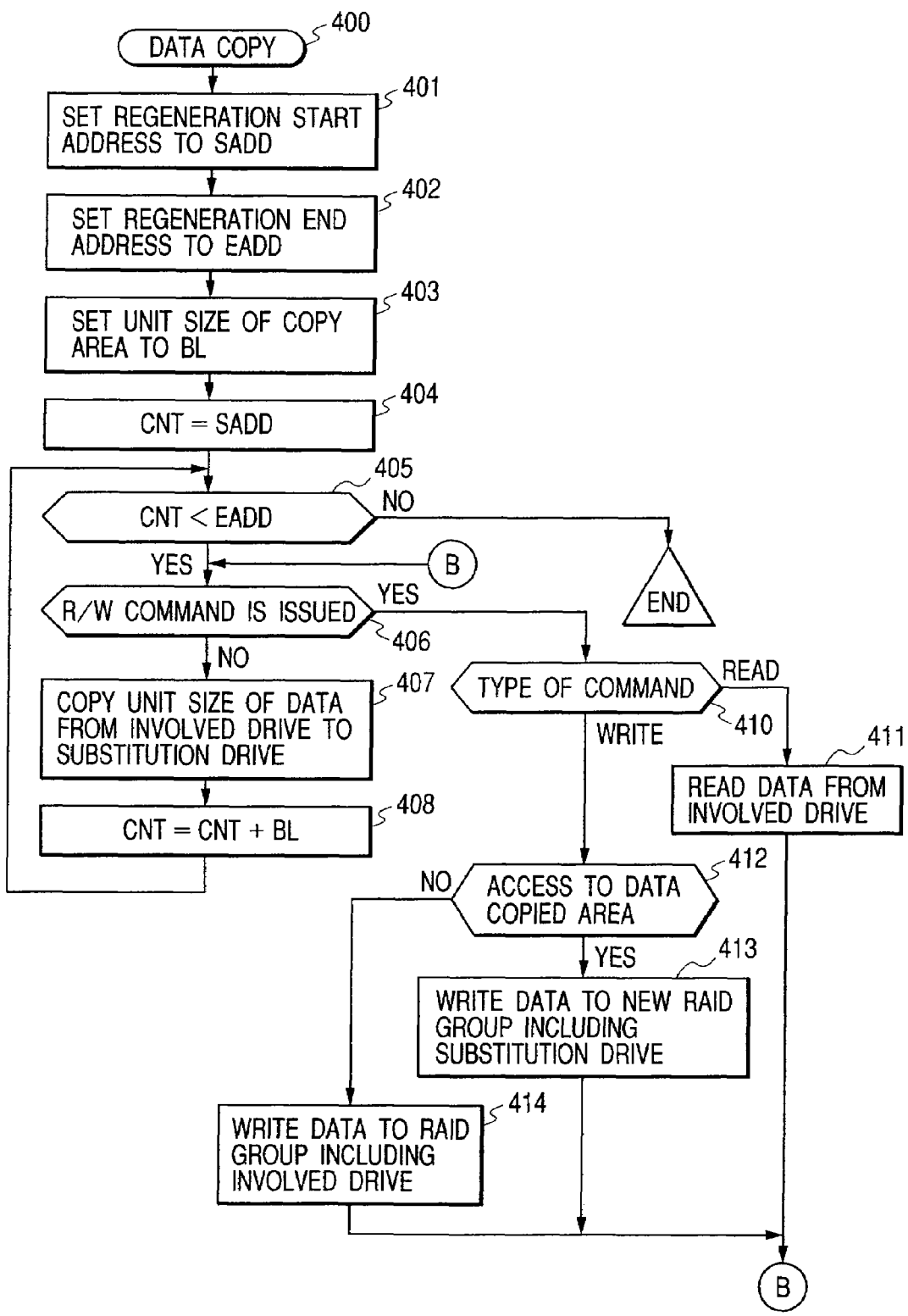
FIG. 17 is a detailed flowchart showing a data copying process 400 in the data regenerating and copying routine 220.

FIG. 17 shows an example of a detailed flowchart showing the data copying process 400 for the substitution drive.

In the data copying process 400, the processor 24 compares values of the parameters CNT and EADD (step 405) after executing the initial values setting in steps 401 to 404 similar to that in the steps 301 to 304 of the data regenerating process 300 (step 405). If the value of CNT is equal to or larger than EADD, the routine is finished. In the case where the value of CNT is smaller than that of EADD, the processor 24 checks whether an access request (a READ/WRITE command) to access the memory space of the involved drive PDEV(EZi) is issued from the host system or not (step 406).

If there is no access request, the processor 24 reads out data for a plurality of data blocks from a memory area specified by the parameters CNT and BL in the involved drive PDEV(EZi) and writes the data into the corresponding memory area of the substitution drive PDEV(RZi) (step 407). After that, the processor 24 adds a value of the block size BL to the parameter CNT (step 408) and returns to the step 405.

In the case where an access request from the host system exists in the step 406, the processor 24 checks the type of the access request (step 410). If the access request is a READ command, the read command is executed on the memory space of the involved drive PDEV(EZi) (step 411) and after that, the control is returned to the step 406.

If the access request is a WRITE command, the processor 24 checks whether the memory area to be accessed corresponds to a memory area having completed data copy to the substitution drive or not (step 412). In the case where the memory area to be accessed corresponds to the memory area having completed data copy, the WRITE command is executed on a new RAID group including the substitution drive PDEV(RZi) (step 413) and after that, the control is returned to the step 406. If the memory area to be accessed corresponds to a memory area for which data copy is not completed yet, the WRITE command is executed on the original RAID group including the involved drive PDEV(EZi) (step 414).

In the embodiment of FIG. 13, the failure recovering process 200 is described in the case of the RAID level 5. However, in the case where the RAID level 823 of an RAID group to be organized is the RAID 1 (the level 1), for example, since a faulty drive and at least one spare drive are included as components of the RAID group, it is sufficient to copy data stored in the spare drive into a substitution drive in the data regenerating and copying process 220. Therefore, the number of components is merely reduced and the reorganization of RAID groups can be realized according to the same procedure as that in the steps 214 to 232 shown in FIG. 13.

In the above embodiment, although the case where failure occurs in one disk drive on the drive board is described, the invention is also applied to a case where failure occurs in a plurality of disk drives on the same board. For example, in the case where failure occurs in two disk drives on the same board, the data regenerating process 300 has only to be executed for each faulty drive and the data copying process 400 has only to be executed for the rest two involved drives.

Figure 18:
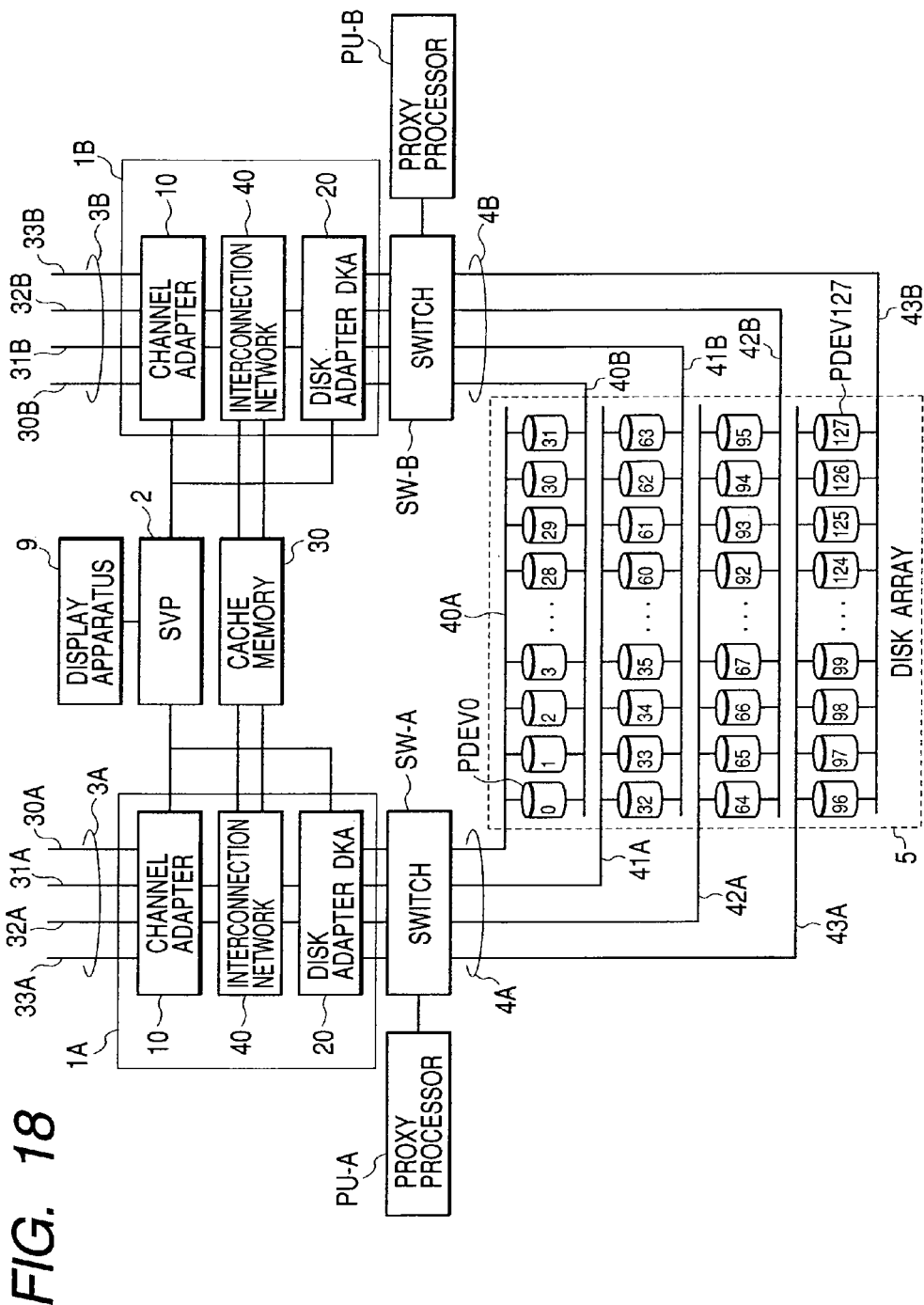
FIG. 18 shows another embodiment of the disk array system to which the invention is applied.

In the embodiment, the data regenerating and copying process 220 is executed by the processor 24 of the disk adapter 20. However, a part of the data regenerating and copying process 220 may be also executed by another processor according to an instruction from the processor 24. Particularly, data copy from the involved drive to the substitution drive can be performed by utilizing an EXTENDED COPY command in SCSI. Therefore, as shown in FIG. 18, for example, system configuration that a switch SW-A (SW-B) is arranged between a disk controller 1A (1B) and a disk channel 4A (4B) and a proxy processor PU-A (PU-B) is connected to the disk channel 4A (4B) via the switch may be also adopted so that the proxy processor copies data stored in a designated involved drive into a designated substitution drive in response to an EXTENDED COPY command issued from the processor 24.

As apparent from the above-mentioned embodiments, according to the invention, as a component of a faulty board is replaced after the reorganization of RAID groups is completed, normal data reading/writing is enabled while the faulty board is detached. Therefore, according to the invention, the packaging density of the drive board is enhanced and sufficient work time can be taken for replacing the faulty drive. Further, since data regeneration for the absent drive based on the logical group is not required while failure component is replaced, the disk access request from the host system can be promptly responded in the invention.

What is claimed is:

1. A disk array system comprising:
   a disk controller connected to a host system via a channel path; and
   a disk array connected to the disk controller via a disk channel, said disk array being composed of a plurality of drive boards each mounting thereon a plurality of disk drives connected to wiring on the board, and a common board provided with a plurality of connectors for connecting the wiring on each of the drive boards to wiring for the disk channel, the a plurality of drive boards being detachably mounted on the common board via the plurality of connectors,
   wherein said disk controller defines a part of the drive boards in the disk array as spare boards and the rest as active boards, manages (N+1) pieces of the disk drives (N≧2) mounted on different drive boards in a group of active drive boards as a logical group, dispersively allocates a memory area for storing error correction information generated in each logical group to the (N+1) pieces of disk drivers or fixedly allocates the memory area to a specific disk drive, and controls the writing and reading of data in the disk array,
   the disk controller comprising:
   means for reorganizing logical groups when failure occurs in any active disk drive in the disk array, after storing the same data as that stored in disk drives on the faulty board on which a faulty drive is mounted into corresponding one of the disk drives on the substitution board selected from among a group of spare drive boards, so that each logical group to which one of disk drives on the faulty board belongs includes a new disk drive on the substitution board in place of the disk drive on the faulty board; and
   means for displaying on a display that the faulty board is replaceable after the reorganization of the logical groups is completed.

2. The disk array system according to claim 1, wherein said means for reorganizing the logical groups comprises:
   means for writing data regenerated based upon data read out from the other plural disk drives that belong to the same logical group as the faulty drive into one of the substitution disk drives on the substitution board in place of the faulty drive; and
   means for copying data read out from normal disk drives mounted on the faulty board into the other of the substitution disk drives on the substitution board.

3. The disk array system according to claim 1, wherein
   bypass circuits for selectively bypassing each connector for connecting to the drive board from wiring for the disk channel; and
   said disk controller is provided with means for switching one of the bypass circuits corresponding to the connector of the faulty board to a bypassed state after the reorganization of the logical groups is completed.

4. The disk array system according to claim 1, wherein said disk controller manages a recovered board as a spare drive board when the recovered board is connected to a connector of the faulty board again.

5. The disk array system according to claim 1, wherein said disk controller has a board management table for managing each of said drive boards forming the disk array according to a status code that changes in the order of a normal state, an exchange waiting state and a spare state, and said disk controller manages a board in a normal state as the active board and a board in a spare state as the spare board.

6. The disk array system according to claim 1, wherein:
   said connectors for connecting with the drive boards are located on the common board in two-dimensional arrangement having coordinate values on the X-axis and the Y-axis, and the plurality of disk drives are arranged on each drive board in a direction of the Z-axis;
   each of said logical group is formed by (N+1) pieces of disk drives having the same X coordinate value, the same Z coordinate value and different Y coordinate value; and
   said means for reorganizing logical groups selects as the substitution board a drive board having the same Y coordinate value as that of the faulty board from among a group of spare drive boards, and correlates the disk drives on the faulty board and substitution disk drives on the substitution board according to respective Z coordinate values.

7. A failure recovering control method executed by a disk controller in a disk array system composed of the disk controller connected to a host system, and a disk array connected to the disk controller via a disk channel, the disk array being composed of a plurality of drive boards each mounting thereon a plurality of disk drives connected to wiring on the board, and a common board provided with a plurality of connectors for connecting the wiring on each of the drive boards to wiring for the disk channel, the plurality of drive boards being detachably mounted on the common board via the plurality of connectors,
   wherein said disk controller defines a part of the drive boards in the disk array as spare boards and the rest as active boards, manages (N+1) pieces of disk drives (N≧2) mounted on different drive boards in a group of active drive boards as a logical group, dispersively allocates a memory area for storing error correction information generated in each logical group to the plurality of disk drives or fixedly allocates the memory area to a specific disk drive, and controls the writing and reading of data in the disk array, the method comprising the steps of:

selecting a substitution board to be used in place of a faulty board on which a faulty drive is mounted from among a group of said spare drive boards when failure occurs in any active disk drive in the disk array;

storing the same data as that stored in each disk drive on the faulty board into disk drives on the substitution board selected from among the group of spare drive boards;

reorganizing logical groups to each of which a disk drive on the faulty board belongs into new configuration including a new disk drives on the substitution board in place of the disk drive on the faulty board; and displaying on a display that the faulty board is replaceable after the logical groups are reorganized.

8. The failure recovering control method according to claim 7, wherein the step of storing data into the disk drives on the substitution board is comprised of:

a step of writing data regenerated based upon data read out from the other plural disk drives that belong to the same logical group as the faulty drive into one of substitution disk drives on the substitution board in place of the faulty drive; and a step of sequentially copying data read out from normal disk drives mounted on the faulty board into the other of the substitution disk drives on the substitution board.

9. The failure recovering control method according to claim 7, wherein the common board is provided with a plurality of bypass circuits for selectively bypassing each connector for connecting to the drive board from wiring for the disk channel; and the control method further comprising a step of switching one of the bypass circuits corresponding to a connector of the faulty board to a bypassed state after the reorganization of the logical groups.

10. A disk array system comprising:

a disk controller; and a disk array connected to the disk controller, said disk array being composed of a plurality of drive boards each mounting thereon a plurality of disk drives, and a common board on which the a plurality of drive boards being detachably mounted, wherein said disk controller defines a part of the drive boards in the disk array as a first drive board group and the rest as a second drive board group, and manages a plurality of disk drives mounted on different drive boards in the first drive board group as a logical group, the disk controller comprising:

means for reorganizing logical groups when failure occurs in any active disk drive belonging to the first drive board group, after storing the same data as that stored in disk drives on the faulty board on which a faulty drive is mounted into corresponding one of the disk drives on a substitution board selected from the second drive board group, so that each logical group to which one of disk drives on the faulty board belongs includes a new disk drive on the substitution board in place of the disk drive on the faulty board; and means for displaying on a display that the faulty board is replaceable after the reorganization of the logical groups is completed.

11. The disk array system according to claim 10 wherein said means for reorganizing the logical groups comprises:

means for writing data regenerated based upon data read out from the other plural disk drives that belong to the same logical group as the faulty drive into one of the substitution disk drives on the substitution board in place of the faulty drive; and means for copying data read out from normal disk drives mounted on the faulty board into the other of the substitution disk drives on the substitution board.

12. The disk array system according to claim 10, wherein said common board is provided with a plurality of connectors for connecting wiring on each of the drive boards to wiring for disk channel, and a plurality of bypass circuits for selectively bypassing each of said connectors from the wiring for the disk channel; and said disk controller is provided with means for switching one of the bypass circuits corresponding to the connector of the faulty board to a bypassed state after the reorganization of the logical groups is completed.

13. The disk array system according to claim 10, wherein said common board is provided with a plurality of connectors for connecting wiring on each of the drive boards to wiring for disk channel; and said disk controller manages a recovered board as a drive board belonging to said second drive board group when the recovered board is connected to a connector of the faulty board again.

14. The disk array system according to claim 10, wherein said disk controller has a board management table for managing each of said drive boards forming the disk array according to a status code that changes in the order of a normal state, an exchange waiting state and a spare state, and said disk controller manages a board in a normal state as a drive board belonging to said first drive board group and a board in a spare state as a drive board belonging to said second drive board group.

15. The disk array system according to claim 10, wherein:

said common board is provided with a plurality of connectors for connecting wiring on each of the drive boards to wiring for disk channel, said connectors are located on the common board in two-dimensional arrangement having coordinate values on the X-axis and the Y-axis, and the plurality of disk drives are arranged on each drive board in a direction of the Z axis;

each of said logical group is formed by a plurality of disk drives having the same X coordinate value, the same Z coordinate value and different Y coordinate value; and said means for reorganizing logical groups selects as the substitution board a drive board having the same Y coordinate value as that of the faulty board from said second drive board group, and correlates the disk drives on the faulty board and substitution disk drives on the substitution board according to respective Z coordinate values.

16. The disk array system according to claim 10, wherein:

said disk controller performs data read and data write in said disk array, recognizing drive boards belonging to said first disk drive board group as active drive boards and each drive board belonging to said second disk drive board group as a spare drive board, and said means for reorganizing logical groups adds said substitution board to the active drive boards and excludes said faulty board from the active drive boards after storing data into the disk drives on the substitution board.

17. A failure recovering control method executed by a disk controller in a disk array system composed of the disk controller and a disk array connected to the disk controller, the disk array being composed of a plurality of drive boards each mounting thereon a plurality of disk drives, and a common board on which the plurality of drive boards being detachably mounted, wherein said disk controller defines a part of the drive boards in the disk array as a first drive board group and the rest as a second drive board group, manages a plurality of disk drives mounted on different drive boards in said first drive board group as a logical group, the method comprising the steps of:

selecting a substitution board to be used in place of a faulty board on which a faulty drive is mounted from said second drive board group when failure occurs in any active disk drive belonging to said first drive board group;

storing the same data as that stored in each disk drive on the faulty board into disk drives on the substitution board;

reorganizing logical groups to each of which a disk drive on the faulty board belongs into new configuration including a new disk drives on the substitution board in place of the disk drive on the faulty board; and displaying on a display that the faulty board is replaceable after the logical groups are reorganized.

18. The failure recovering control method according to claim 17, wherein the step of storing data into the disk drives on the substitution board is comprised of:

a step of writing data regenerated based upon data read out from the other plural disk drives that belong to the same logical group as the faulty drive into one of substitution disk drives on the substitution board in place of the faulty drive; and a step of copying data read out from normal disk drives mounted on the faulty board into the other of the substitution disk drives on the substitution board.

19. The failure recovering control method according to claim 17, wherein:

said common board is provided with a plurality of connectors for connecting wiring on each of the drive boards to wiring for disk channel and a plurality of bypass circuits for selectively bypassing each of said connectors from wiring for the disk channel; and the control method further comprising a step of switching one of the bypass circuits corresponding to a connector of the faulty board to a bypassed state after the reorganization of the logical groups.

20. The failure recovering control method according to claim 17, wherein:

said disk controller performs data read and data write in said disk array, recognizing drive boards belonging to said first disk drive board group as active drive boards and each drive board belonging to said second disk drive board group as a spare drive board, adds said substitution board having been completed data storing to the active drive boards and excludes said faulty board from the active drive boards through said reorganization of logical group performed when failure occurs in any active disk drive.

* * * * *

UNITED STATES PATENT AND TRADEMARK OFFICE
CERTIFICATE OF CORRECTION

PATENT NO. : 7,424,639 B2  Page 1 of 1
APPLICATION NO. : 11/548140
DATED : September 9, 2008
INVENTOR(S) : Tanaka et al.

It is certified that error appears in the above-identified patent and that said Letters Patent is hereby corrected as shown below:

On the Title Page, item [75]:

"Inventors: Katsuya Tanaka, Tokyo (JP);
 Tetsuya Uemura, Tokyo (JP)"

Should read,

-- Inventors: Katsuya Tanaka, Kokubunji (JP);
 Tetsuya Uemura, Sayama (JP) --

Signed and Sealed this

Sixteenth Day of June, 2009

JOHN DOLL
*Acting Director of the United States Patent and Trademark Office*